(12) United States Patent
Castor et al.

(10) Patent No.: US 11,375,349 B2
(45) Date of Patent: *Jun. 28, 2022

(54) ELECTRONIC-DEVICE DETECTION AND ACTIVITY ASSOCIATION

(71) Applicant: Jon Castor, Woodside, CA (US)

(72) Inventors: Jon Castor, Woodside, CA (US); Andrew G. Stevens, New York, NY (US)

(73) Assignee: Jon Castor, Woodside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,145

(22) Filed: Aug. 31, 2020

(65) Prior Publication Data

US 2020/0396573 A1 Dec. 17, 2020

Related U.S. Application Data

(63) Continuation of application No. 15/783,145, filed on Oct. 13, 2017, now Pat. No. 10,805,775, which is a continuation-in-part of application No. 14/935,288, filed on Nov. 6, 2015, now Pat. No. 9,801,013.

(51) Int. Cl.
| | |
|---|---|
| H04W 4/02 | (2018.01) |
| H04W 64/00 | (2009.01) |
| H04L 12/26 | (2006.01) |
| H04W 4/38 | (2018.01) |
| H04W 68/00 | (2009.01) |
| G06F 11/34 | (2006.01) |
| H04W 4/029 | (2018.01) |

(Continued)

(52) U.S. Cl.
CPC ............ *H04W 4/38* (2018.02); *G06F 11/3404* (2013.01); *H04W 4/029* (2018.02); *H04W 4/80* (2018.02); *H04W 64/00* (2013.01); *H04W 68/005* (2013.01); *H04L 61/6022* (2013.01)

(58) Field of Classification Search
None
See application file for complete search history.

(56) References Cited

U.S. PATENT DOCUMENTS

| | | | | |
|---|---|---|---|---|
| 2011/0102133 A1* | 5/2011 | Shaffer | ................. | G08B 25/14 340/5.1 |
| 2014/0266682 A1* | 9/2014 | Gettings | ................. | G06F 21/64 340/517 |

(Continued)

*Primary Examiner* — Scott M Sciacca
(74) *Attorney, Agent, or Firm* — Steven Stupp

(57) ABSTRACT

An electronic device may receive information associated with another electronic device that is proximate to the electronic device. Then, the electronic device may identify the other electronic device based on an identifier (such as a Media Access Control address) that is included in the information that is associated with the other electronic device. Moreover, the electronic device may access a pattern of activity for a region that includes the electronic device, where the pattern of activity includes events and identifiers of one or more electronic devices in the region during the events. For example, the events may include reported criminal activity. Next, the electronic device may determine an association between the other electronic device and at least one of the events based on the pattern of activity. Furthermore, the electronic device may provide a notification based on the determined association.

20 Claims, 19 Drawing Sheets

(51) Int. Cl.
*H04W 4/80* (2018.01)
*H04L 101/622* (2022.01)

(56) References Cited

U.S. PATENT DOCUMENTS

| | | | | |
|---|---|---|---|---|
| 2014/0281479 | A1* | 9/2014 | Gettings | G06Q 10/08 713/150 |
| 2015/0131483 | A1* | 5/2015 | Colban | H04W 48/20 370/254 |
| 2015/0327010 | A1* | 11/2015 | Gottschalk | H04W 4/021 455/456.1 |
| 2016/0080378 | A1* | 3/2016 | VanBlon | H04W 64/003 455/410 |

* cited by examiner

ELECTRONIC-DEVICE DETECTION AND ACTIVITY ASSOCIATION

CROSS REFERENCE TO RELATED APPLICATIONS

This application is a Continuation of U.S. patent application Ser. No. 15/783,145, "Electronic-Device Detection and Activity Association," filed on Oct. 13, 2017, by Jon Castor and Andrew G. Stevens, which is Continuation-in-Part of U.S. patent application Ser. No. 14/935,288 (now U.S. Pat. No. 9,801,013), "Electronic-Device Association Based on Location Duration," filed on Nov. 6, 2015, by Adam M. Gettings, Tianren Wang, Yi Zheng, Welyang Yu, Brian Christensen, Ellis Garai, Steven Sensarn and Andrew G. Stevens, the contents of both of which are herein incorporated by reference.

BACKGROUND

Field

The described embodiments relate to techniques for detecting an electronic device and associating the electronic device with a pattern of activity.

Related Art

The increasing capabilities of electronic devices is expanding their utility and the range of applications in which they are used. For example, voice-controlled intelligent personal assistants are increasingly popular electronic devices that allow users to perform tasks and access information using natural-language commands. In particular, by vocalizing a predefined wake word, a user can activate a voice-controlled intelligent personal assistant. Then, the user can vocalize one or more predefined keywords to perform tasks, such as ordering a product or a service, controlling another electronic device in proximity, etc.

However, the capabilities of many voice-controlled intelligent personal assistants are often limited by the need for the users to provide the wake word and for the users to memorize the predefined keywords. In addition, the sensory capabilities of many voice-controlled intelligent personal assistants are often restricted, which can limit the situation awareness of these voice-controlled intelligent personal assistants. Consequently, the types of services that can be provided by existing voice-controlled intelligent personal assistants may be constrained or limited.

SUMMARY

A first group of embodiments relates to an electronic device that provides a notification. This electronic device may include: an interface circuit that communicates with one or more other electronic devices; a processor; and memory that stores a program module. When executed by the processor, the program module causes the electronic device to perform one or more operations. In particular, the electronic device may receive information associated with another electronic device that is proximate to the electronic device. Then, the electronic device may identify the other electronic device based on at least an identifier (such as a Media Access Control or MAC address, or one or more other identifiers associated with the other electronic device, or that is associated with an application that is installed on the other electronic device) that is included in the information that is associated with the other electronic device. Moreover, the electronic device may access a pattern of activity for a region that includes the electronic device, where the pattern of activity includes events and identifiers of one or more electronic devices in the region during the events. For example, the events may include reported criminal activity or a type of service. Next, the electronic device may determine an association between the other electronic device and at least one of the events based on the pattern of activity. Furthermore, the electronic device may provide the notification based on the determined association.

Note that accessing the pattern of activity may involve: providing, via the interface circuit, a request for a computer for the pattern of activity; and receiving, via the interface circuit, a response associated with the computer with the pattern of activity.

Moreover, the pattern of activity may be associated with a time interval.

Furthermore, the information associated with the other electronic device may be received using wireless communication.

Additionally, the notification may include information specifying a second electronic device.

In some embodiments, the notification includes a recommendation that the other electronic device be allowed to pair, connect or associate with a wireless network in the region based on a repeated presence of the other electronic device in the region. Alternatively, the notification may include a recommendation that the other electronic device be added to an emergency call list of a user of the electronic device based on a repeated presence of the other electronic device in the region.

Another embodiment provides a computer-readable storage medium for use in conjunction with the electronic device. This readable storage medium may include a program module that, when executed by the electronic device causes the electronic device to perform at least some of the aforementioned operations of the electronic device.

Another embodiment provides a method for providing a notification. This method may include at least some of the aforementioned operations performed by the electronic device.

A second group of embodiments provides an electronic device that selectively monitors an environment of the electronic device. This electronic device may include: an interface circuit that communicates with one or more other electronic devices; a processor; an acoustic sensor; and memory that stores a program module. When executed by the processor, the program module causes the electronic device to perform one or more operations. In particular, the electronic device may have a selective monitoring mode and an expansive monitoring mode. During the selective monitoring mode, the electronic device may locally analyze acoustic information acquired using the acoustic sensor. This may allow the electronic device to identify or classify an event in a first group of events (such as a baby crying, glass breaking, a fire alarm or a carbon-monoxide-detector alarm, a loud noise, etc.) and to perform a corresponding remedial action (such as provide a notification or an alert). Moreover, when a change condition is detected (such as when the electronic device determines, based on acoustic or other information, that a user has left an environment of the electronic device or that the user has indicated that the electronic device should switch to the expansive monitoring mode), the electronic device may transition to the expansive monitoring mode. During the expansive monitoring mode, the electronic device may locally and/or remotely analyze acoustic information acquired using the acoustic sensor. This may allow the electronic device and/or an associated remote computer to identify or classify an event in a second group of events (which may include more events than the first group of events) and to perform a corresponding remedial action (such as provide a notification or an alert).

Another embodiment provides a computer-readable storage medium for use in conjunction with the electronic device. This readable storage medium may include a program module that, when executed by the electronic device causes the electronic device to perform at least some of the aforementioned operations of the electronic device.

Another embodiment provides a method for operating in a selective monitoring mode and an expansive monitoring mode. This method may include at least some of the aforementioned operations performed by the electronic device.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

Figure 1:
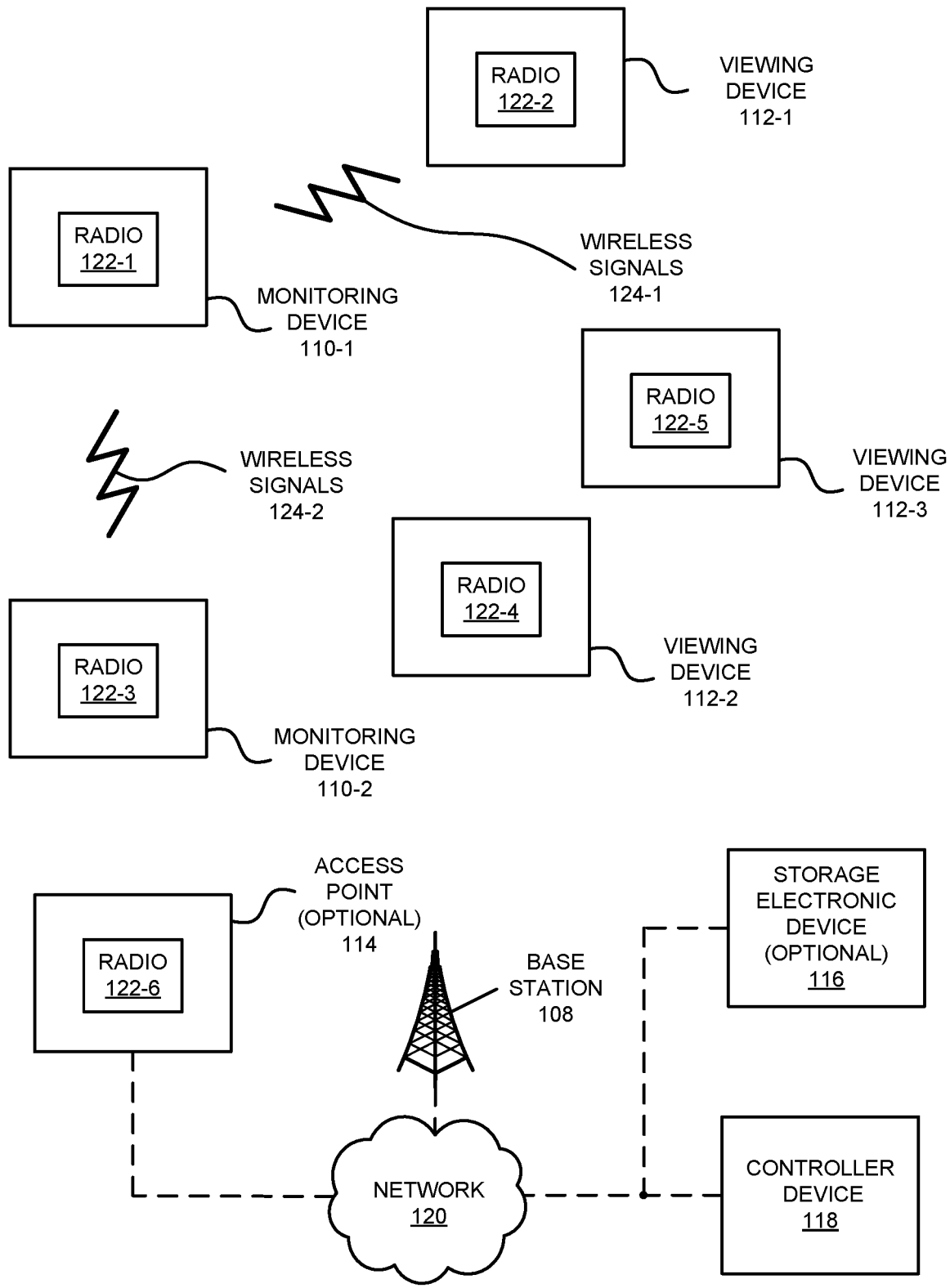
FIG. 1 is a block diagram illustrating electronic devices communicating in accordance with an embodiment of the present disclosure.

Table 1 provides pseudo-code for use with one of the electronic devices of FIG. 1 in accordance with an embodiment of the present disclosure.

Table 2 provides pseudo-code for use with one of the electronic devices of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In a first group of embodiments, an electronic device that selectively provides a notification is described. In particular, the electronic device may receive information associated with another electronic device that is proximate to the electronic device. Then, the electronic device may identify the other electronic device based on at least an identifier (such as a Media Access Control or MAC address or one or more other identifiers associated with the other electronic device, or that is associated with an application that is installed on the other electronic device) that is included in the information that is associated with the other electronic device. Moreover, the electronic device may access a pattern of activity for a region that includes the electronic device, where the pattern of activity includes events and identifiers of one or more electronic devices in the region during the events. For example, the events may include reported criminal activity. Next, the electronic device may determine an association between the other electronic device and at least one of the events based on the pattern of activity. Furthermore, the electronic device may provide the notification (such as an alert) based on the determined association.

By selectively providing the notification, this monitoring technique may allow the electronic device to electronically (such as wirelessly) monitor an environment (such as a geographic region, a house, an apartment, at least a portion of a building, etc.), which is proximate to the electronic device (such as within wireless range of the electronic device) and that is within the region, for potential threats or particular patterns of activity, behavior or types of events. More generally, the monitoring technique may allow the electronic device to detect patterns of activity or changes in patterns of activity in the environment. For example, the monitoring technique may determine an identifier of a service provider that provided a service (such as package delivery, gardening, house cleaning, food delivery, home healthcare, etc.), which may allow a quality of the service fulfillment to be associated with specific service providers. Alternatively or additionally, the electronic device may recommend, based on the repeated presence of the identifier during the events, that the other electronic device be allowed to pair, connect or associate with a wireless network in the environment. More generally, the electronic device may make the recommendation based on repeated encounters or familiarity of the other electronic device (which is sometimes referred to as 'device familiarity'). In these ways, the monitoring technique may provide situational awareness to a user of the electronic device when the user of the electronic device is or is not present in the environment. In some embodiments, the notification includes a recommendation that the other electronic device be added to an emergency call list or a notification list of a user of the electronic device based on a repeated presence of the other electronic device in the region. Note that, based on the emergency call list or the notification list, a user may receive a notification via a mobile application, an email, a text message, or other alert. This situational awareness may allow the user to make informed decisions regarding potential threats, service quality, etc. Consequently, the monitoring technique may facilitate dynamic electronic monitoring of the environment, which may provide users with more control over the environment and peace of mind.

In a second group of embodiments, a controller electronic device selectively associates one or more monitoring electronic devices and a viewing electronic device, so that the viewing electronic device can selectively access content acquired by the one or more monitoring electronic devices, such as captured images and/or measured acoustic information corresponding to sound in environments. In particular, the controller electronic device may receive messages with timestamps and current locations of a monitoring electronic device that is associated with the monitoring electronic device. Based on a duration of time the monitoring electronic device is at a fixed or an approximately fixed location, the controller electronic device may establish associations between the viewing electronic device and the one or more monitoring electronic devices. For example, the number of associations and/or a maximum distance associated with the associations may increase as the duration of time increases. Alternatively, the controller electronic device may remove the associations when a difference between a current location of the monitoring electronic device and the fixed location exceeds a predefined value.

By dynamically expanding the spatial extent of the associations the longer the monitoring electronic device remains at the fixed or the approximately fixed location, this association technique may allow a network of monitoring electronic devices to be built or assembled over time. In particular, the controller electronic device may associate the viewing electronic device with a group of monitoring electronic devices covering an area of increasing spatial extent, while reducing the likelihood that unsuitable parties will gain access to shared content, such as the captured images and/or the measured acoustic information in the environments. Therefore, the controller electronic device may enable a dynamic network of monitoring electronic devices, such as a dynamic neighborhood watch. In the process, the controller electronic device may allow users to avoid waste and the opportunity cost of unused legacy electronic devices, which may increase user satisfaction.

Communication between electronic devices (such as the monitoring electronic devices, the viewing electronic devices and/or the controller electronic device) may utilize wired, optical and/or wireless communication. For example, the wireless communication may involve communicating packets or frames that are transmitted and received by radios in the electronic devices in accordance with a communication protocol, such as: Bluetooth® (from the Bluetooth Special Interest Group of Kirkland, Wash.), an Institute of Electrical and Electronics Engineers (IEEE) 802.15 standard (such as ZigBee® from the ZigBee® Alliance of San Ramon, Calif.), an Institute of Electrical and Electronics Engineers (IEEE) 802.11 standard, Z-Wave, a power-line communication standard, an infra-red communication standard, a universal serial bus (USB) communication standard, a near-field-communication standard or specification (from the NFC Forum of Wakefield, Mass.), another wireless ad-hoc network standard, and/or another type of wireless interface. In some embodiments, the communication protocol may be compatible with a $2^{nd}$ generation or mobile telecommunication technology, a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. For example, the communication protocol may include Long Term Evolution or LTE. In addition, the communication may occur via a wide variety of frequency bands, including frequencies associated with the so-called 'white space' in frequencies bands associated with analog television broadcasting.

The communication between the electronic devices is shown in FIG. 1, which presents a block diagram illustrating communication among optional base station 108, monitoring electronic devices 110, viewing electronic devices 112, optional access point 114, one or more optional storage electronic devices (such as optional storage electronic device 116), and/or one or more controller electronic devices (such as controller electronic device 118) via network 120 (such as a cellular-telephone network, the Internet, a wireless local area network, an Ethernet network, an intra-net, an optical network, etc.). In particular, the communication in FIG. 1 may involve the exchange of packets. These packets may be included in frames in one or more channels.

Moreover, as described further below with reference to FIG. 19, monitoring electronic devices 110, viewing electronic devices 112, optional access point 114, optional storage electronic device 116, and/or controller electronic device 118 may include subsystems, such as: a networking subsystem, a memory subsystem, a processing subsystem, an optional user-interface subsystem, and an optional sensor subsystem. In addition, these electronic devices may include radios 122 in the networking subsystems. More generally, monitoring electronic devices 110, viewing electronic devices 112, optional access point 114, optional storage electronic device 116, and/or controller electronic device 118 can include (or can be included within) any electronic devices with networking subsystems that enable wirelessly or wired communication with another electronic device. This can comprise transmitting frames on wireless channels to enable the electronic devices to make initial contact, followed by exchanging subsequent data/management frames (such as connect requests or petitions to establish a connection or link), configuring security options (e.g., encryption on a link or in a mesh network), transmitting and receiving packets or frames, etc.

As can be seen in FIG. 1, wireless signals 124 (represented by jagged lines) are transmitted from/received by radios (such as radios 122) in optional base station 108, monitoring electronic devices 110, viewing electronic devices 112 and/or optional access point 114 (which may allow monitoring electronic device 110-2 and/or viewing electronic device 112-3 to wirelessly access network 120 via a wireless local area network). In general, wireless communication among these electronic devices may or may not involve a connection being established among the electronic devices, and therefore may or may not involve communication via a wireless network. (Note that the communication with optional storage electronic device 116, and/or controller electronic device 118 may occur via network 120, which may involve wired or optical communication with a different communication protocol than wireless signals 124.)

Furthermore, the processing of a packet or frame in an electronic device (such as monitoring electronic device 110-1) may include: receiving wireless signals 124 with the packet or frame; decoding/extracting the packet or frame from received wireless signals 124 to acquire the packet or frame; and processing the packet or frame to determine information contained in the packet or frame (such as at least a portion of a data packet).

Figure 2:
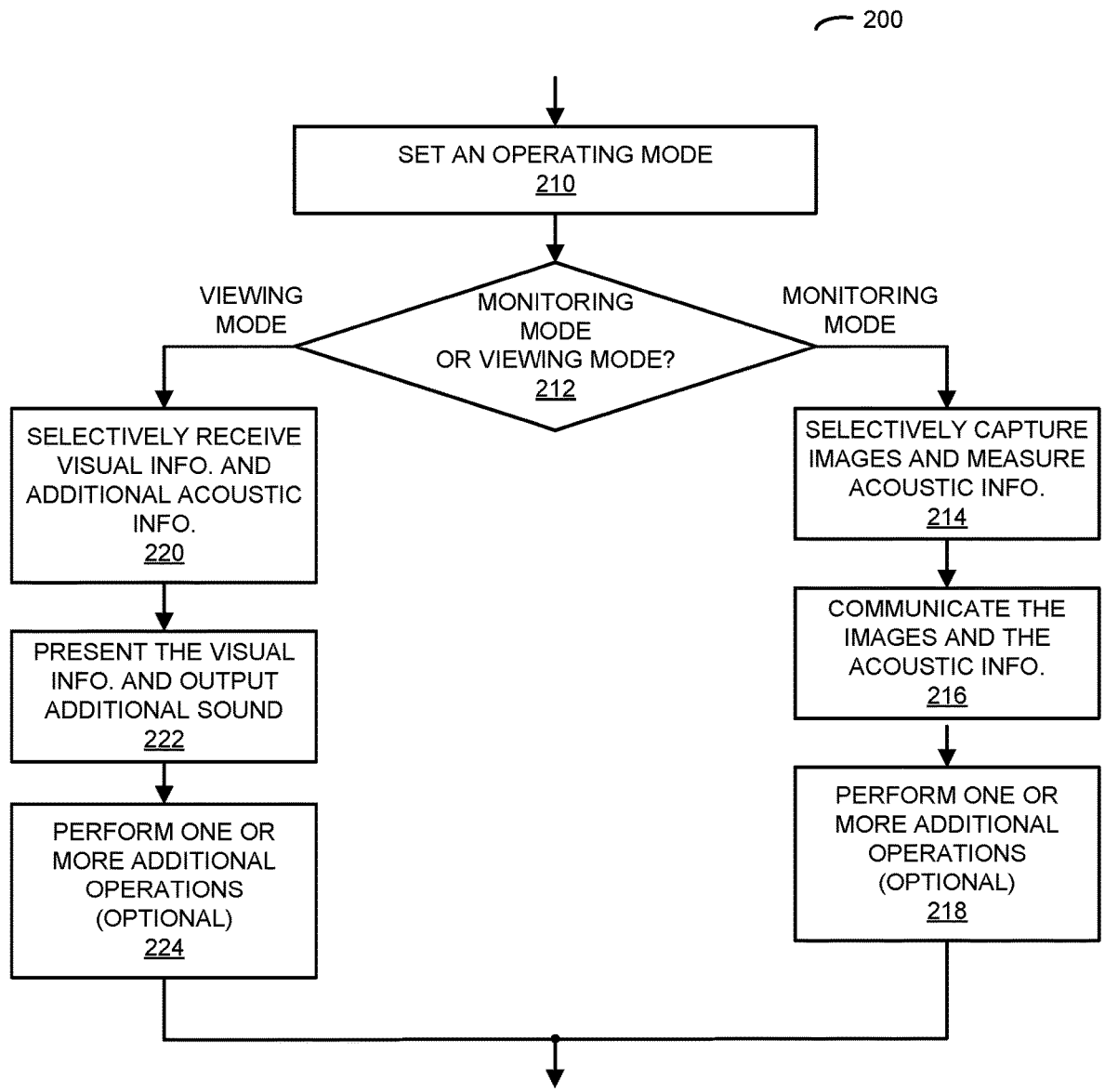
FIG. 2 is a flow diagram illustrating a method for facilitating environmental monitoring in FIG. 1 in accordance with an embodiment of the present disclosure.

As described further below with reference to FIGS. 2 and 3, monitoring electronic devices 110 and viewing electronic devices 112 may be arranged into at least pairs. For example, one of viewing electronic devices 112 (such as viewing electronic device 112-1) may be paired with or associated with one or more of monitoring electronic devices 110 (such as monitoring electronic device 110-1). In particular, a given user may own or may be associated with a given pairing. Moreover, monitoring electronic devices 110 and viewing electronic devices 112 may execute instances of a program module. This program module may allow monitoring electronic devices 110 and viewing electronic devices 112 to be operated in a monitoring mode or a viewing mode. When an electronic device executing an instance of the program module is operated in the monitoring mode, it is referred to as a 'monitoring electronic device' (such as one of monitoring electronic devices 110). Similarly, when an electronic device executing an instance of the program module is operated in the viewing mode, it is referred to as a 'viewing electronic device' (such as one of viewing electronic devices 112). Note that a user may select the monitoring mode or the viewing mode for a given electronic device (e.g., using a user interface, as described further below with reference to FIG. 4). Alternatively, the given electronic device may select the monitoring mode or the viewing mode based on its location (such as whether it is at the same location for an extended time interval, e.g., several hours, one or more days, etc.).

Figure 6:
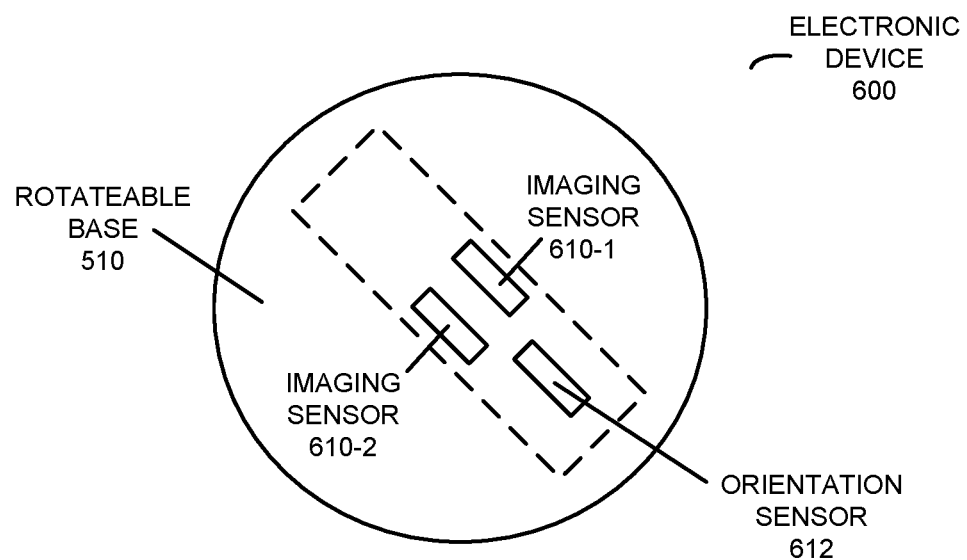
FIG. 6 is a drawing illustrating a top view of an electronic device in FIG. 5 in accordance with an embodiment of the present disclosure.

As described further below with reference to FIG. 6, in the monitoring mode a given one of monitoring electronic devices 110 (such as monitoring electronic device 110-1) may monitor an environment that includes monitoring electronic device 110-1 or that is proximate to the environment that includes monitoring electronic device 110-1 (which is sometimes referred to as an 'external environment'). For example, monitoring electronic device 110-1 may monitor the environment within a building (such as a region, a room, etc.), an object (such as a car, a truck, a container, a package, etc.), etc. Alternatively or additionally, monitoring electronic device 110-1 may monitor the external environment outside of the building (such as a region adjacent to the building, the outside of the building, etc.), the object, etc. In an exemplary embodiment, monitoring electronic device 110-1 may include at least two imaging sensors (such as two cameras), one of which monitors an interior of an environment (such as a room in a house) and the other monitors a region outside of the environment (such as a region outside of a house). Thus, at least the two imaging sensors may have different fields of view.

When monitoring the environment and/or the external environment, monitoring electronic devices 110 may include sensors that at least selectively capture images and/or measure acoustic information corresponding to sound that characterize events (and, more generally, conditions, such as environmental conditions, e.g., temperature, humidity, air quality, etc.). For example, an acoustic sensor (such as a microphone) in monitoring electronic device 110-1 may detect an acoustic event, such as: insertion of a key into a lock, a sound exceeding a threshold level (e.g., 60-80 dB), a type of sound (e.g., a fire alarm, breaking glass, a moving car, yelling or shouting, cursing, a cry for help, a gunshot, etc.) and/or activation of acoustic sources in the environment having a predefined or a predetermined phase relationship (e.g., smoke and/or carbon-monoxide detectors at different locations in a building, which have different acoustic latencies to a location of monitoring electronic device 110-1. In response, monitoring electronic device 110-1 may capture the images and measure the acoustic information corresponding to or that represents sound. (While images and/or acoustic information are used as illustrations of the type of information selectively captured or measured by monitoring electronic devices 110, in some embodiments additional types of measures are performed by at least some of monitoring electronic devices 110 when these monitoring electronic devices include additional sensors.)

Alternatively or additionally, monitoring electronic device 110-1 may detect motion in the environment and/or the external environment (e.g., using a motion detector and/or by comparing images acquired at different times using an imaging sensor), and in response monitoring electronic device 110-1 may capture additional images and/or may measure the acoustic information. In some embodiments, an occurrence of an event is determined based on a history of events for an environment and/or the external environment, such as by comparing the measured acoustic information with a history of acoustic events and/or by comparing a captured image (or difference of two images) with historical motion events to determine if something anomalous or usual is occurring.

In some embodiments, monitoring electronic device 110-1 may at least selectively capture the images and measure the acoustic information based on an alert about an occurrence of an event in the environment that is received from a governmental organization. For example, a municipality (such as a city government) or a police department may provide the alert in response to a burglary or criminal activity nearby, and in response monitoring electronic device 110-1 may captures images and/or acoustic information. This content may be subsequently shared or provided to the governmental organization.

Figure 5:
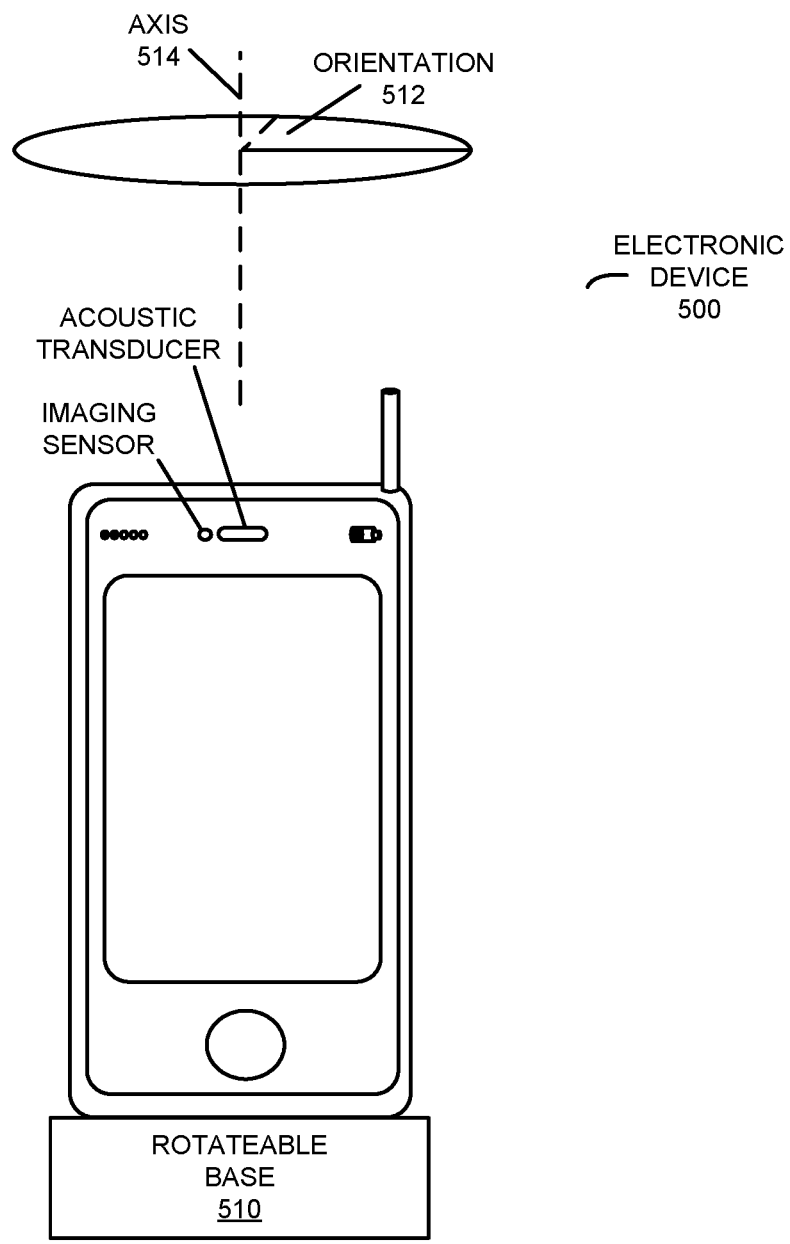
FIG. 5 is a drawing illustrating an electronic device in FIG. 1 in accordance with an embodiment of the present disclosure.

As described further below with reference to FIG. 5, when an event occurs, a rotatable base may change an angular orientation during the selective capture of the images and measurement of the acoustic information. For example, monitoring electronic device 110-1 may analyze the measured acoustic information from multiple microphones (or acoustic transducers) to determine a location of a source or to track movement of the source, and then, via the rotatable base, may change the angular orientation so that the imaging sensor faces the source or keeps the source centered in a field of view of the imaging sensor (which may involve dynamically rotating the rotatable base to follow the motion of the source). Alternatively or additionally, a voice or sound recognition technique may be used to identify a particular source (such as a person) in a crowded acoustic environment and, then, monitoring electronic device 110-1 may be rotated to follow this source as it moves in the environment.

After capturing the images and/or measuring the acoustic information, monitoring electronic device 110-1 may compute analysis results based on the captured images and/or the measured acoustic information. The analysis results may indicate safety conditions, activities, environmental conditions and, more generally, events in the environment and/or the external environment. For example, by analyzing the captured images and/or the measured acoustic information monitoring electronic device 110-1 may determine the presence of: activation of an alarm (such as a smoke detector, a carbon-monoxide detector, a dual smoke detector and carbon-monoxide detector, a car alarm, a burglar alarm and/or another alarm), fire, flooding, carbon monoxide, a power outage, a chemical contaminant, an infestation, opening of a door, an individual entering or leaving a room, an individual getting out of bed, an individual waking up, an individual crying, an individual tossing and turning in bed, an individual shivering, a change in health condition of an individual (such as an illness, a chronic disease, etc.), a crime in progress, unusual activity or other irregular occurrences (such as a unusual vehicle driving down the street), delivery of the mail or a package, etc.

In an exemplary embodiment, monitoring electronic device 110-1 detects an audible acoustic alert or alarm based on sound intensity, time-domain information and/or or frequency-domain information in temporal audio samples of the sound received by a microphone. For example, the sound may include a temporal 3 acoustic pattern, with a beep, pause and an alarm pattern or signal, which is compatible with an American National Standards Institute standard S3.42 1990. In order to facilitate this capability, monitoring electronic device 110-1 may be calibrated to: confirm that the alarm can be heard or detected by monitoring electronic device 110-1, identify the alarm device (such as a smoke detector), determine the location of the alarm device, and/or determine an acoustic characteristic of the environment (e.g., based on sound output by monitoring electronic device 110-1 and/or from another acoustic source). This calibration may occur when: monitoring electronic device 110-1 is first installed or used, after a time interval (such as every 3 or 6 months) and/or when the environment is changed (such as when one or more objects in the environment are moved, when monitoring electronic device 110-1 is moved, etc.). Note that the acoustic characteristic may include: a location of the alarm device (such as a location of the alarm device relative to monitoring electronic device 110-1); a detection threshold for monitoring electronic device 110-1 at its current location to use when determining if the alarm device is activated; and/or an acoustic transfer function (such as an amplitude and/or phase as a function of frequency) or an acoustic profile (such as an acoustic latency or a delay of an echo) of the environment proximate to the alarm device and monitoring electronic device 110-1. Moreover, the location of the alarm device may be specified by or determined from: an image of the environment, a positioning system (such as the Global Positioning System or GPS), a communication network (such as a cellular-telephone network), and/or an acoustic latency in the environment. In some embodiments, the location is determined by trilateration, triangulation, and/or the acoustic characteristic of the environment. For example, the location may be determined using multiple microphones. Thus, the location may be absolute or relative (such as a position in the environment relative to monitoring electronic device 110-1).

Once a given monitoring electronic device (such as monitoring electronic device 110-1) has captured the images and/or measured the acoustic information, monitoring electronic device 110-1 may share this content (as well as analysis results) with one or more of the other electronic devices in FIG. 1. For example, monitoring electronic device 110-1 may provide the content or an alert or notification indicating that such content is available to at least viewing electronic device 112-1 (i.e., one or more other electronic devices with which monitoring electronic device 110-1 is paired). In some embodiments, monitoring electronic device 110-1 and at least viewing electronic device 112-1 have or establish a peer-to-peer connection, which allows them to communicate via peer-to-peer communication. Note that the peer-to-peer connection may allow one-to-one or one-to-many communication (such as with a group of paired or associated electronic devices).

In response to receiving the content or the alert, viewing electronic device 112-1 may access and then may display at least some of the images and/or may output the sound, thereby allowing a user to remotely monitor the event(s) in the environment and/or the external environment. Alternatively, viewing electronic device 112-1 may present the alert to the user, which may allow the user to decide whether to selectively access the content. For example, the alert may be presented to the user in a user interface. This user interface may include or specify a notification about the environmental and/or the external environment, such as an alarm sounding, and may include one or more icons that allow the individual to: listen to an audio recording of the measured sounds associated with an event, contact emergency services, and/or indicate that the event is a false positive.

Furthermore, as described further below, monitoring electronic device 110-1 may share the content and/or the alert with one or more additional viewing electronic devices in viewing electronic device 112 that are paired or associated with monitoring electronic device 110-1, and that are used by other users. For example, the other users may include: an emergency contact specified by a user or an owner of viewing electronic device 112-1; users that the user or the owner of viewing electronic device 112-1 has allowed to access the content and/or the alert; representatives of an insurance company (who may provide a discount on the user's homeowner's insurance in exchange for the monitoring); and/or an owner of a building that includes the environment. In some embodiments, monitoring electronic device 110-1 provides the content and/or the alert to optional storage electronic device 116, where it may be subsequently accessed by viewing electronic device 112-1 and/or the one or more additional viewing electronic devices. In some embodiments, optional storage electronic device 116 stores the content in a secure, certified historical record or log of the conditions of the environment and/or the external environment (such as a time record of the safety conditions, the activities, the environmental conditions and, more generally, the events). Note that optional storage electronic device 116 may analyze the content, and thus may store and provide analysis results to viewing electronic device 112-1 and/or the one or more additional viewing electronic devices.

Moreover, monitoring electronic device 110-1 may restrict the type of content that is shared with the one or more additional viewing electronic devices. For example, monitoring electronic device 110-1 may only share content (such as images and/or acoustic information) for the external environment with the one or more additional viewing electronic devices. In particular, monitoring electronic device 110-1 may include an orientation sensor that allows monitoring electronic device 110-1 to determine an orientation of monitoring electronic device 110-1, so that monitoring electronic device 110-1 can identify and only share images of the external environment with the one or more additional viewing electronic devices, thereby enabling collective monitoring (such as a virtual 'neighborhood watch') of a street or an outside region by multiple users, while protecting the privacy of the users.

Furthermore, the content provided by monitoring electronic device 110-1 and/or optional storage electronic device 116 may be protected. This may involve encryption using an encryption key (such as an encryption key associated with monitoring electronic device 110-1). The encryption key may use symmetric or asymmetric encryption techniques. Alternatively or additionally, a secure or one-way cryptographic hash function (such as SHA-256) may be used. As described further below with reference to FIGS. 7-14, when associations are established between at least pairs of monitoring electronic devices 110 and viewing electronic devices 112, credentials used to access content, encryption keys and/or information specifying cryptographic hash functions may be exchanged to facilitate controlled and secure sharing of the content.

In an exemplary embodiment, monitoring electronic devices 110 and viewing electronic devices 112 are cellular telephones. At least monitoring electronic devices 110 may be one or more 'older' models (i.e., legacy electronic devices). In particular, monitoring electronic devices 110 and/or viewing electronic devices 112 may execute one or more older or previous versions of operating systems that current or latest versions of the one or more operating systems. This may be the case because a current or latest version of an operating system may exceed the hardware capabilities of monitoring electronic devices 110 and/or viewing electronic devices 112. For example, when monitoring electronic devices 110 and/or viewing electronic devices 112 execute the current or latest version of the operating system: an operating life of a power source (such as a battery) may be less than a predefined value (such as several hours); an execution speed of a program module may be less than a second predefined value (e.g., there may be delays of 0.5-10 s that are noticeable to the user or that may prevent events from being captured); an amount of the memory available to the program module may be less than a third predefined value (such as the minimum of amount of memory needed to execute the program module); and/or an amount of non-volatile storage available to the program module may be less than a fourth predefined value (such as the minimum of amount of non-volatile storage to store the content).

The program module may include features that allow monitoring electronic devices 110 and/or viewing electronic devices 112 to be repurposed to perform the preceding operations. For example, in the monitoring mode, the program module may disable one or more features of monitoring electronic devices 110 to conserve system resources, such as processor speed, memory, battery life, etc. Alternatively or additionally, monitoring electronic devices 110 may adjust an exposure time of one or more imaging sensors based on one of: a time of day, ambient lighting conditions and a quality metric for the images (such as signal-to-noise ratio).

As described further below with reference to FIGS. 7 and 8, when the program module determines that a power supply in a given monitoring electronic device (such as monitoring electronic device 110-1) provides power from an external power source (such as an AC power socket), the program module may ensure that monitoring electronic device 110-1 remains in the monitoring mode and does not transitions to a power-saving mode when monitoring electronic device 110-1 is inactive. For example, the program mode may disable a timer in monitoring electronic device 110-1 that is used to transition monitoring electronic device 110-1 to the power-saving mode. Alternatively, when the power supply provides power from an internal power source (such as a battery), the program module may selectively provide an activity signal that keeps monitoring electronic device 110-1 remains in the monitoring mode and does not transitions to a power-saving mode when monitoring electronic device 110-1 is inactive. This capability may ensure that monitoring electronic device 110-1 continues to monitor the environment and/or the external environment. (However, in some embodiments, when the power supply provides power from the internal power source, the program module may selectively allow, based on a configuration setting, monitoring electronic device 110-1 to transition to the power-saving mode when monitoring electronic device 110-1 is inactive and to transition back to the monitoring mode when the acoustic event occurs.)

Note that the program module may receive a proof-of-life request from another electronic device (such as one of viewing electronic devices 112) and may provide a response to the proof-of-life request. The response may indicate that monitoring electronic device 110-1 remains in the monitoring mode and has power. For example, an insurance carrier (that provides insurance coverage for the environment or one or more objects in the environment) may provide one or more requests (e.g., periodically, after a time interval, randomly and/or as needed) to confirm that monitoring electronic device 110-1 is monitoring the environment and/or the external environment.

Moreover, as noted previously, monitoring electronic devices 110 may be associated or paired with additional viewing electronic devices. In particular, users may register their monitoring electronic devices and viewing electronic devices with one or more controller electronic devices, such as controller electronic device 118. For example, the registration may occur when a user installs the program module on an electronic device. During registration, the user may define a minimal pairing or association, such as a designated monitoring electronic device and its associated viewing electronic device (e.g., monitoring electronic device 110-1 and viewing electronic device 112-1). Moreover, credentials, encryption keys and/or secure hash functions may be specified and/or exchanged between monitoring electronic device 110-1 and viewing electronic device 112-1 when the pairing or association is defined, and the credentials, the encryption keys and/or the secure hash functions may be specified or provided to controller electronic device 118. Alternatively or additionally, controller electronic device 118 may specify or provide the credentials, the encryption keys and/or the secure hash functions to monitoring electronic device 110-1 and viewing electronic device 112-1. In some embodiments, controller electronic device 118 generates the encryption keys for monitoring electronic device 110-1 and viewing electronic device 112-1.

As described further below with reference to FIGS. 9-11, subsequently controller electronic device 118 may keep track of the locations of monitoring electronic devices 110 as a function of time. For example, monitoring electronic device 110-1 may provide to controller electronic device 118 messages with times stamps and information that specifies the location of monitoring electronic device 110-1 (such as a GPS information or coordinates, cellular-telephone information, wireless-network information, etc.). These messages may be provided by monitoring electronic device 110-1 periodically, after a time interval at a fixed location and/or in response to a request from controller electronic device 118.

If controller electronic device 118 determines, based on the location information, that monitoring electronic device 110-1 is or is approximately at a fixed location (e.g., the location of monitoring electronic device 110-1 remains within 1-100 m of a previous location for at least 1-72 hours), controller electronic device 118 may associate viewing electronic device 112-1 with one or more additional monitoring electronic devices that are proximate to monitoring electronic device 110-1 (including providing or specifying credentials, encryption keys and/or secure hash functions). This may allow a user of viewing electronic device 112-1 to selectively access content acquired by the one or more additional monitoring electronic devices, such as images and/or acoustic information corresponding to sound in at least external environments that are proximate to the one or more additional monitoring electronic devices (and, if allowed during registration by users of the one or more additional monitoring electronic devices, images and/or acoustic information corresponding to sound in environments that include the one or more additional monitoring electronic devices). For example, the spatial extent of the associations may increase the longer monitoring electronic device 110-1 is at the fixed location. Thus, after a day viewing electronic device 112-1 may be associated with additional monitoring electronic devices of the nearest neighbors (or those that are within 50 m), after two days viewing electronic device 112-1 may be associated with additional monitoring electronic devices of second nearest neighbors (or those that are within 100 m), etc. Similarly, controller electronic device 118 may associate monitoring electronic device 110-1 with one or more additional viewing electronic devices that are already associated or paired with the one or more additional monitoring electronic devices, so that users of the one or more additional viewing electronic devices can selectively access content acquired by monitoring electronic device 110-1.

Furthermore, if monitoring electronic device 110-1 is moved from the fixed location (such as the location of monitoring electronic device 110-1 is more than 1-100 m from a previous location of monitoring electronic device 110-1), controller electronic device 118 may discontinue the associations with the one or more additional monitoring electronic devices.

This association technique may allow networks of electronic devices to be securely and dynamically assembled even when monitoring electronic device 110-1 and/or viewing electronic device 112-1 are outside of communication range (such as wireless communication range) with the one or more additional monitoring electronic devices.

Alternatively or additionally, as described further below with reference to FIGS. 12-14, networks of electronic devices may be securely and dynamically assembled based on the pattern of locations of viewing electronic device 112-1 as a function of time. In particular, viewing electronic device 112-1 may receive messages from another electronic device that executes an instance of the program module, such as one of monitoring electronic devices 110 (e.g., monitoring electronic device 110-2) or one of viewing electronic devices 112. These messages may advertise availability of content for an environment at a location associated with monitoring electronic device 110-2. In response, viewing electronic device 112-1 determines whether to request shared access to the content based on the location and locations of one or more of monitoring electronic devices 110 executing additional instances of the program module in a monitoring mode for which viewing electronic device 112-1 already has shared access. For example, the location may be different from the locations. Moreover, viewing electronic device 112-1 may determine whether to request shared access to the content based on a history of locations of viewing electronic device 112-1, which may indicate that viewing electronic device 112-1 was proximate to the location for more than: a predefined number of occasions (such as at least 2-10 times); and/or a predefined time duration (such as at least 5-60 min). Next, viewing electronic device 112-1 may provide a request for shared access to monitoring electronic device 110-2 based on the determination. Furthermore, viewing electronic device 112-1 may receive an acceptance message from monitoring electronic device 110-2 in response to the request, and viewing electronic device 112-1 may selectively accesses the content based on the acceptance message.

Similarly, once paired or associated, monitoring electronic device 110-1 (or another monitoring electronic device previously paired or associated with viewing electronic device 112-1) may share access to content it acquires with viewing electronic device 112-2.

Thus, viewing electronic device 112-1 may pair or associate with monitoring electronic device 110-2 based on regular proximity to the location of monitoring electronic device 110-2 (or, alternatively or additionally, of viewing electronic device 112-2). In particular, as the user moves around with viewing electronic device 112-1, their information network may be dynamically increased.

In these ways, monitoring electronic devices 110, viewing electronic devices 112, optional storage electronic device 116, and/or controller electronic device 118 may be used to: implement an information network that monitors the environments and/or the external environments; and/or aggregate and selectively disseminate content about events in the environments and/or the external environments.

Although we describe the environment shown in FIG. 1 as an example, in alternative embodiments, different numbers or types of electronic devices may be present. For example, some embodiments comprise more or fewer electronic devices.

We now further describe the environmental monitoring and the association techniques. FIG. 2 presents a flow diagram illustrating a method 200 for facilitating environmental monitoring, which may be performed by an electronic device (such as one of monitoring electronic devices 110 or one of viewing electronic devices 112 in FIG. 1). During operation, the electronic device sets an operating mode (operation 210) of the electronic device as a monitoring mode or a viewing mode. For example, the electronic device may execute a version of an operating system that is other than or different from a subsequent version of the operating system (i.e., an older version of the operating system). This may occur because the electronic device may be an older model and hardware limitations (such as an operating life of a power source, an execution speed of a program module, available memory when executing the subsequent version of the operating system, an amount of non-volatile storage available to the program module when executing the subsequent version of the operating system, etc.) may restrict its ability to execute the subsequent or newer version of the operating system.

When the electronic device is in the monitoring mode (operation 212), the electronic device at least selectively captures images and measures acoustic information (operation 214) corresponding to sound of an environment that includes the electronic device, and communicates the images and the acoustic information (operation 216) to a second electronic device (such as a paired or associated viewing electronic device or a storage electronic device). For example, the images may be captured and the acoustic information may be measured based on the occurrence of an event, such as an acoustic event. In particular, the acoustic event may include: insertion of a key into a lock; a sound exceeding a threshold level; a type of sound; and/or activation of acoustic sources in the environment having a predetermined phase relationship (such as a latency of sound associated with the acoustic sources). The electronic device may determine whether to capture the images and to measure the acoustic information based on the occurrence of the acoustic event and a history of acoustic events in the environment (e.g., by comparing the acoustic event with the history of acoustic events to determine if it is anomalous).

Alternatively or additionally, using hardware (such as a motion sensor) and/or software, the electronic device may detect motion in the environment, and the selective capturing of the images and measuring the acoustic information may be based on the detection of motion and a history of motion events in the environment (which may be used to determine if the detected motion is anomalous or unusual). For example, the electronic device may routinely capture images (such as every 10 s), and may detect motion based on differences between captured images. Then, when motion is detected, the electronic device may capture images more often (such as at a frame rate of an imaging sensor).

Note that the electronic device may use histories of events at one or more locations (i.e., from one or more monitoring electronic devices) when determining whether a particular event is anomalous or unusual (and, thus, worth of being presented to a user on an associated or paired viewing electronic device).

In some embodiments, the at least selectively capturing the images and measuring the acoustic information, and communicating the images and the acoustic information to the second electronic device may be based on an alert about an occurrence of an event in the environment (such as possible criminal activity, a natural disaster, an emergency, etc.) that is received from a governmental organization (such as a police department, a fire department, local government, e.g., a municipality, etc.) or an insurance carrier.

Note that, when the electronic device is in the monitoring mode, the electronic device may perform one or more optional operations (operation 218). For example, the electronic device may receive a proof-of-life request from the second electronic device, and may provide a response to the proof-of-life request. This response may indicate that the electronic device remains in the monitoring mode and has power.

Alternatively or additionally, when the electronic device is in the monitoring mode, the electronic device may disable one or more other functions of the electronic device. For example, functions other than those needed to perform the monitoring and to communicate the content may be disabled.

In some embodiments, when the electronic device is in the monitoring mode, the electronic device adjusts an exposure time of the imaging sensor based on: a time of day, ambient lighting conditions and/or a quality metric for the images. For example, the exposure time may be increased at times of day when there is less light, when the ambient lighting is below a threshold value (such as an illumination of less than 10-100 lux or lumens/$m^2$), and/or when a signal-to-noise ratio in the images is less than a second threshold value (such as 20-30 dB).

Alternatively, when the electronic device is in the viewing mode (operation 212), the electronic device at least selectively receives visual information (such as images, text, graphics, etc.) and additional acoustic information (operation 220) from the second electronic device, presents the visual information (operation 222) on the display, and outputs additional sound (operation 222) corresponding to the additional acoustic information using the acoustic transducer. Furthermore, when the electronic device is in the viewing mode, the electronic device may perform one or more optional operations (operation 224). For example, the electronic device may establish a peer-to-peer connection with the second electronic device.

In some embodiments, the second electronic device includes cloud-based storage for a third electronic device that monitors another environment (such as a data repository for the other environment that maintains a record of all events that occur in the other environment). Thus, when the electronic device is in the viewing mode, it may selectively access the visual information and the additional audio information from the cloud-based storage. Alternatively, when the electronic device is in the monitoring mode, it may provide the images and the acoustic information to the cloud-based storage, where it is subsequently selectively accessed by the third electronic device.

While the electronic device may selectively access content (such as images and/or audio information) for an environment based on events that occur in or proximate to the environment, in some embodiments the selective access is based on a location of the environment. For example, the electronic device may selectively access the content based on interests of a user. These interests may be predefined by the user (such as in a user profile) and/or may be based on user behaviors (such as web pages or websites visited by the user, search queries provided by the user, products purchased by the user, etc.). In some embodiments, the electronic device selectively access the content for the user (i.e., without an explicit request from the user). Thus, if the user is considering a vacation at the location, the electronic device may selectively access content from monitoring electronic devices at or proximate to the location. Alternatively or additionally, the user can access live streams via a network (such as the Internet), such as a web camera for Lake Tahoe or a volcano. Such web-camera access may be used as marketing lead information for travel services that market travel and lodging to or near a location that the user views repeatedly.

Figure 3:
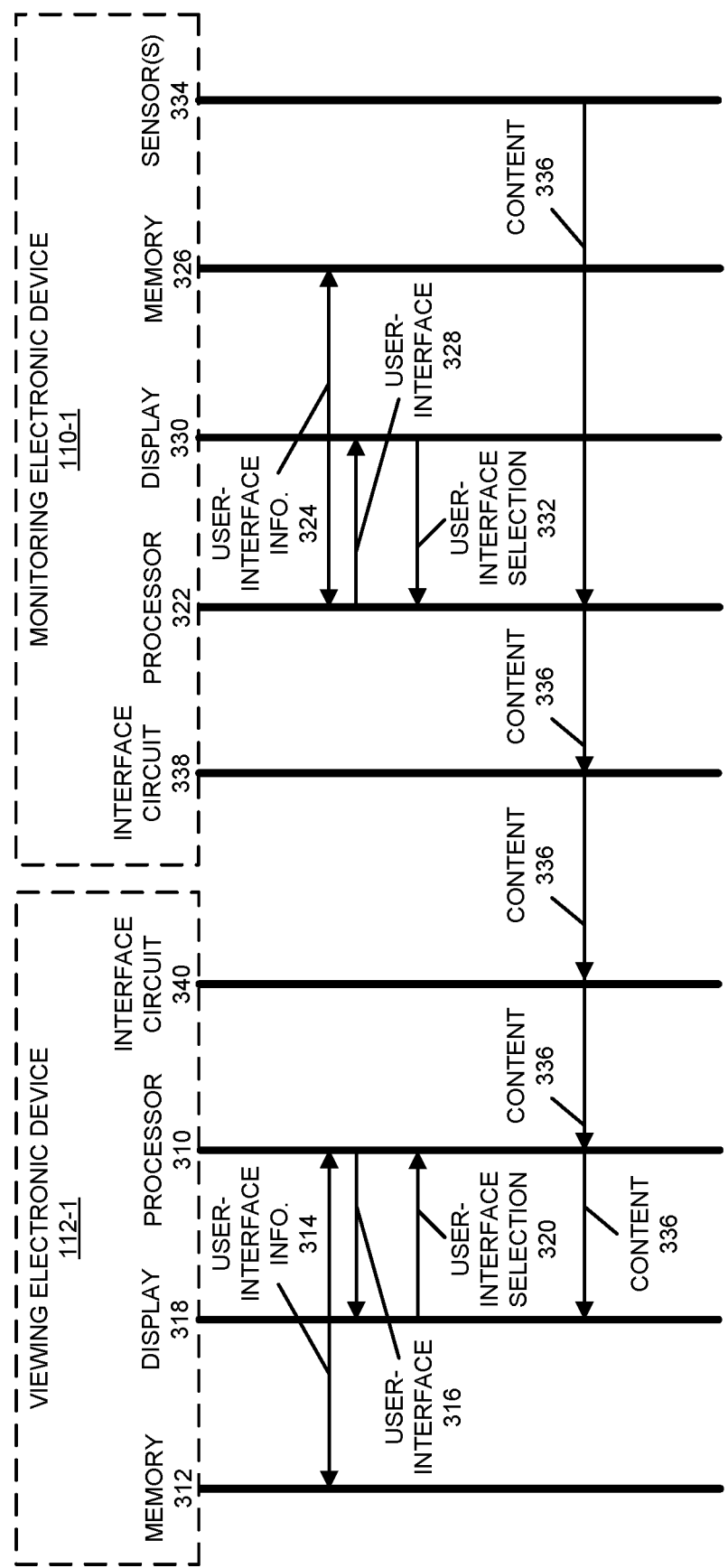
FIG. 3 is a drawing illustrating communication among at least some of the electronic devices of FIG. 1 in accordance with an embodiment of the present disclosure.

Embodiments of the communication technique are further illustrated in FIG. 3, which presents a drawing illustrating communication between monitoring electronic device 110-1 and viewing electronic device 112-1. In particular, processor 310 executing an instance of a program module in viewing electronic device 112-1 may display user interface 316 on display 318 based on user-interface information 314, which is accessed in memory 312. Moreover, processor 310 may receive a user-interface selection 320 (such as when the user clicks on or touches an icon in user interface 316) to select a particular operating mode of viewing electronic device 112-1 (i.e., the viewing mode). Similarly, processor 322 executing another instance of the program module in monitoring electronic device 110-1 may display user interface 328 on display 330 based on user-interface information 324, which is accessed in memory 326. Furthermore, processor 322 may receive a user-interface selection 332 (such as when the user clicks on or touches an icon in user interface 328) to select a particular operating mode of monitoring electronic device 110-1 (i.e., the monitoring mode). In some embodiments, either or both the operating modes are predefined, e.g., based on settings stored in memories 312 and 326.

Subsequently, sensor(s) 334 in monitoring electronic device 110-1 may capture content 336 (such as one or more images and/or audio information corresponding to sound). For example, content 336 may be captured when an event occurs, such as a loud sound or motion is detected. Alternatively or additionally, content 336 may be captured based on an alert or a notification received from a third party, such as an insurance carrier or a governmental organization. Sensor(s) 334 may provide content 336 to processor 322, which provides it to interface circuit 338. Then, interface circuit 338 may communicate content 336 to interface circuit 340, which provides it to processor 322. Next, processor 310 may present content 336 on display 310 and/or speakers (not shown).

In these ways, the environmental monitoring technique may allow electronic devices (including legacy electronic devices) to be dynamically repurposed for use in monitoring the environment and/or presenting images and/or audio information to users. Consequently, the improved functionality and services facilitated by the environmental monitoring technique may increase the use of the electronic devices (and, more generally, commercial activity) and may enhance customer satisfaction with the electronic device. Note that paired or associated electronic devices (such as a monitoring electronic device and a viewing electronic device) may reverse roles, thereby allowing two-way monitoring of different environments.

Figure 4:
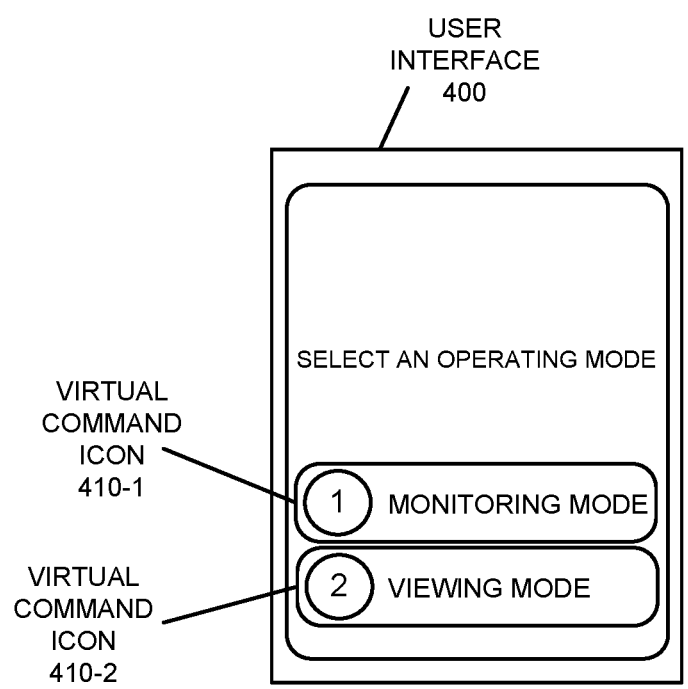
FIG. 4 is a drawing illustrating a user interface in an electronic device in FIG. 1 in accordance with an embodiment of the present disclosure.

As discussed previously, a user may select an operating mode of an electronic device using a user interface. This is shown in FIG. 4, which presents a drawing illustrating a user interface 400 in an electronic device in FIG. 1 (such as a user's cellular telephone). In particular, user interface 400 may be presented on a touch-sensitive display and may include virtual command icons 410 that correspond to the monitoring mode and the viewing mode. By contacting a surface of the touch-sensitive display within a virtual strike area of a given virtual command icon (such as virtual command icon 410-1) and/or subsequently breaking contact with the surface, the user may activate the given virtual command icon and, thus, may select one of the operating modes.

Note that user interface 400 may be generated by a program module executing on the electronic device based on user-interface information.

In some embodiments, the electronic device includes a rotatable base. This is illustrated in FIG. 5, which presents a drawing illustrating electronic device 500 (such as one of the electronic devices in FIG. 1). During the selective capture of the images and measurement of the acoustic information, rotatable base 510 may change an angular orientation 512 of electronic device 500 in the environment. For example, rotatable base 510 may rotate electronic device 500 about an axis 514 so that electronic device 500 tracks sound or a moving object in the environment. In this way, sensor(s), such as an imaging sensor, in electronic device 500 may keep an object of interest centered in its field of view.

Alternatively, a rotatable base 510 may rotate electronic device 500 about an axis 514 so that the electronic device 500 sweeps an area in response to a sound or detected motion (e.g., if the sound or motion is complicated or difficult to track, the rotatable base 510 can perform one or more sweeps with the field of view of a sensor, such as an imaging sensor in the electronic device 500, in order to have a better chance of capturing video of the source of the sound). Note that the sweep can be left and right, up or down, or any other suitable combination, can vary from −90° to +90°, and/or can be performed multiple times in response to a triggering event (such as motion or a sound above a threshold).

Additionally, the electronic device may include multiple imaging sensors with different fields of view, such as on opposite sides of the electronic device. This is illustrated in FIG. 6, which presents a drawing illustrating a top view of electronic device 500 (such as one of the electronic devices in FIG. 1) with imaging sensors 610. While selectively capturing the images, electronic device 500 may switch between imaging sensor 610-1 and imaging sensor 610-2 based on motion in the environment and the measured acoustic information. In this way, electronic device 500 may track an object of interest in the environment so one of imaging sensors 610 has the object in its field of view at a particular time.

In some embodiments, electronic device 500 includes an orientation sensor 612 (such as a compass, an accelerometer, etc.) that, during operation, determines an orientation of electronic device 500. Moreover, imaging sensor 610-1 may face an interior of a building or a room, while imaging sensor 610-2 may face an external environment (such as the exterior of the building or room). Note that images acquired using imaging sensor 610-1 may include sensitive or personal information about a user.

Consequently, electronic device 500 may use the determined orientation to identify images acquired or captured using imaging sensor 610-2, and may provide authorization to at least selectively access these images to one or more additional electronic devices, such as an electronic device executing an instance of the program module in the viewing mode. For example, the authorization may include credentials and/or an encryption key that facilitates the selective access. In some embodiments, the authorization is provided to one or more additional electronic devices that are paired or associated with electronic device 500. However, in other embodiments, the images captured by imaging sensor 610-2 are considered public and, therefore, may be shared with one or more additional electronic devices that are not associated or paired with electronic device 500. Thus, the user may be willing to share images acquired using imaging sensor 610-2 with arbitrary users (such as their neighbors), but may not be willing to share images acquired using imaging sensor 610-1 with these users. (In some embodiments the user is willing to share video acquired using imaging sensor 610-2, but is only willing to share still images acquired using imaging sensor 610-1.)

In this way, a virtual 'neighborhood watch' may be assembled to allow activities on a street or in a neighborhood to be monitored. For example, by combining the acquired content with the locations of monitoring electronic devices (such as GPS coordinates) in a neighborhood, it may be possible to track events in real time and/or after the fact.

In an exemplary embodiment, the program module is an application that can be used to retrofit an older cellular telephone and convert it into a security device that records video, detects loud noises, detects smoke-detector and carbon-monoxide alarms using the microphones, etc. For example, a user may use the application on their current cellular telephone in the viewing mode, and may use the application on their older cellular telephone in the monitoring mode (i.e., as a surveillance telephone). Moreover, updates to the older cellular telephone may no longer be supported by the manufacturer. Therefore, the older cellular telephone may be at end of life or at the end of a support contract, and this may not be able to upgrade to the latest version of the operating system. While such as older cellular telephone may not have the latest features or capabilities, it may retain limited functionality that can be harnessed or used by the application.

The user may select the monitoring mode and the various monitoring techniques (such as acoustic monitoring, video, etc.) on the older cellular telephone, and may specify communication to a cloud-based storage device and/or the user's current cellular telephone. Then, the user may mount the older cellular telephone in a window (such as using two-sided tape, a suction-cup mount, a magnetic mount, etc.). One camera in the older cellular telephone may face out towards the street and another camera in the older cellular telephone may face inside of the home. Images acquired using the outward facing camera may be shared with the public or a subset of all users (e.g., the other houses in the neighborhood). However, if a camera is facing inside of the house, the garage, or the backyard, a user may choose not to share those images with the public.

Note that the direction that a camera is facing can be determined using a compass. Moreover, the location of the older cellular telephone may be determined using GPS and/or a local positioning system (such as a positioning system associated with a wireless local area network). The location and the direction of a camera can be used specify a portion of a 'live street view' or a 'live neighborhood watch.' In turn, other users can use the location and the direction to identify content that augments or fills in holes in their 'map' of the neighborhood, and thus can be used to determine associations or pairings that would be beneficial to these users, so that they can request to associate or pair with these monitoring electronic devices.

As noted previously, in some embodiments the environmental monitoring is facilitated by: placing the older cellular telephone on a rotatable base; adding a fisheye (or wide-angle) lens over the built-in camera; and plugging the older cellular telephone into its charger. Note that the rotatable base may have a Bluetooth-controlled motor that allows the application and/or the user (e.g., remotely via their current cellular telephone) to pivot the older cellular telephone for additional viewing angles. For example, the rotatable based may facilitate a motion-detection sweep. In particular, when motion is detected, a motor in the rotatable base may swivel the older cellular telephone to scan or sweep the area one or more times using a spatial pattern (such as a 120° or 360° swivel), which may be specified or defined by the user. This capability may also allow the user to manually control orientation of the older cellular telephone from a remote location via their current cellular telephone.

The monitoring electronic device may provide real-time feeds that can use machine vision to track: pets, weather, cars, pedestrians, routines of individuals in a neighborhood (such as when neighbors get home), mail or product delivery, when trash or recycling is picked up, etc. Moreover, the history of these events may be used to classify an event and/or to determine if the event is unusual. For example, cars that drive by without abnormal acoustic sound (such as screeching tires or a blaring radio) may be deemed 'normal.' This capability may be used to filter the content, either locally (such as on the monitoring electronic device) and/or remotely (such as on the cloud-based storage system or the viewing electronic device).

In addition to selectively capturing the images and/or measuring the acoustic information, the older cellular telephone may report power outages, Internet outages, etc. Moreover, the older cellular telephone may communicate with other Bluetooth devices (such as a whistle dog collar), so that user can be informed if their pet dog or cat has escaped the range of the older cellular telephone (a so-called 'dog is out' alert).

In some embodiments, the content is stored on a cloud-based storage device, such as a server. For example, the content may be stored: on a per-event basis (which may allow users to pay for the storage service as they go), differentially (relative to previously stored content), during a time interval and/or continuously. Note that the content may be stored on the cloud-based storage device with user approval. Moreover, the content may be captured collaboratively (such as based on an alert from the police about possible criminal activity in a neighborhood) and/or the content may be reviewed collaboratively by a group of users that has shared access to the content to identify a subset of the content that is of interest. Alternatively or additionally, the content may be communicated from a monitoring electronic device to a viewing electronic device using email, a Short Message Service, etc. This may allow the monitoring electronic device to send pictures or video summaries (e.g., low-framerate video, low-resolution video, animation, photographs, etc.) to the viewing electronic device.

As noted previously, in addition to sharing content among associated or paired electronic devices, at least some of the content may be shared publically, such as with neighbors or with other interested parties. This may facilitate public views, such as of a beach, at a mountain, weather monitoring, etc. In this way, this subset of the content may be accessible and may be promoted in the application (e.g., conditions nearby, view all public monitoring electronic devices, etc.).

Figure 7:
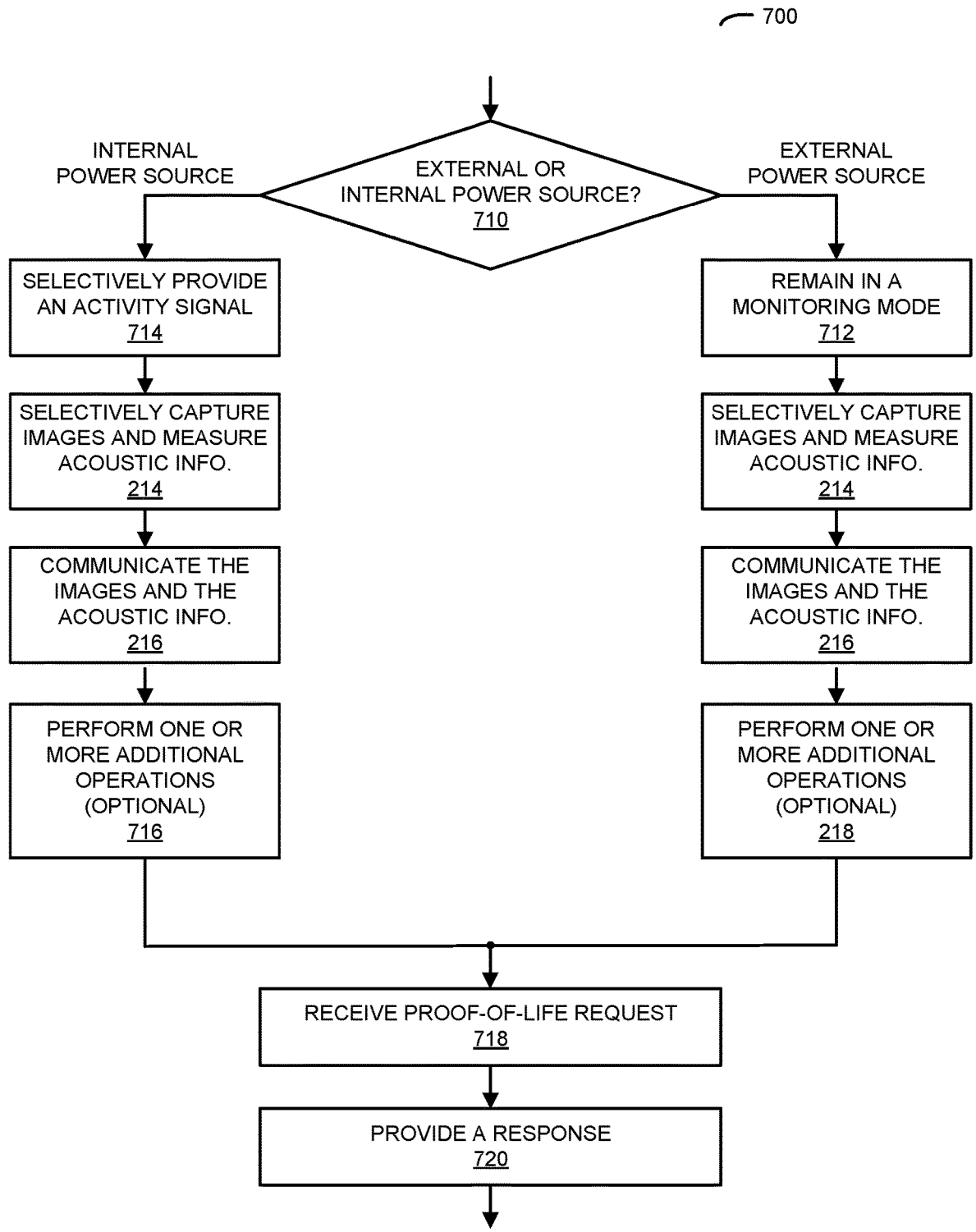
FIG. 7 is a flow diagram illustrating a method for facilitating environmental monitoring in FIG. 1 in accordance with an embodiment of the present disclosure.

FIG. 7 presents a flow diagram illustrating a method 700 for facilitating environmental monitoring in FIG. 1, which may be performed by an electronic device (such as one of monitoring electronic devices 110 in FIG. 1). During operation, the electronic device determines whether a power supply in the electronic device provides power from an external power source or an internal power source (such as a battery) (operation 710). When the power supply provides power from the external power source (operation 710), the electronic device remains in a monitoring mode (operation 712) without transitioning to a power-saving mode when the electronic device is inactive. In the monitoring mode, the electronic device at least selectively captures images and measures acoustic information corresponding to sound (operation 214) in an environment that includes the electronic device, and communicates the images and the acoustic information to a second electronic device (operation 216) (such as a paired or associated viewing electronic device or a storage electronic device). For example, the electronic device may remain in the monitoring mode without transitioning to the power-saving mode by disabling a timer in the electronic device that is used to transition the electronic device to the power-saving mode. (Alternatively or additionally, when the power supply provides power from the external power source, the electronic device may remain in the monitoring mode without transitioning to the power-saving mode by providing an activity signal that keeps the electronic device in the monitoring mode without transitioning to the power-saving mode when the electronic device is inactive.)

Furthermore, when the power supply provides power from the internal power source (operation 710), the electronic device selectively provides the activity signal (operation 714) that keeps the electronic device in the monitoring mode without transitioning to the power-saving mode when the electronic device is inactive. For example, the activity signal may be provided periodically, after a time interval (such as 1-5 min) and/or as needed. (Alternatively or additionally, when the power supply provides power from the internal power source, the electronic device may remain in the monitoring mode without transitioning to the power-saving mode by disabling the timer in the electronic device that is used to transition the electronic device to the power-saving mode.)

In some embodiments, when the power supply provides power from the internal power source (operation 710), the electronic device may optionally perform one or more additional operations (operation 716). For example, the electronic device may selectively allow, based on a configuration setting, the electronic device to transition to the power-saving mode when the electronic device is inactive and to transition back to the monitoring mode when the acoustic event occurs. This capability may allow the electronic device to transition to the power-saving mode during a power outage to conserve the internal power source. In particular, the electronic device may transition to the power-saving mode for image capture, but may maintain acoustic monitoring in an active mode so that acoustic events can still be detected and used to gate transitioning image capture back to the active mode so that images can be selectively captured.

Note that the electronic device may receive a proof-of-life request (operation 718) from the second electronic device and may provide a response (operation 720) to the proof-of-life request. The response may indicate that the electronic device remains in the monitoring mode and has power.

Figure 8:
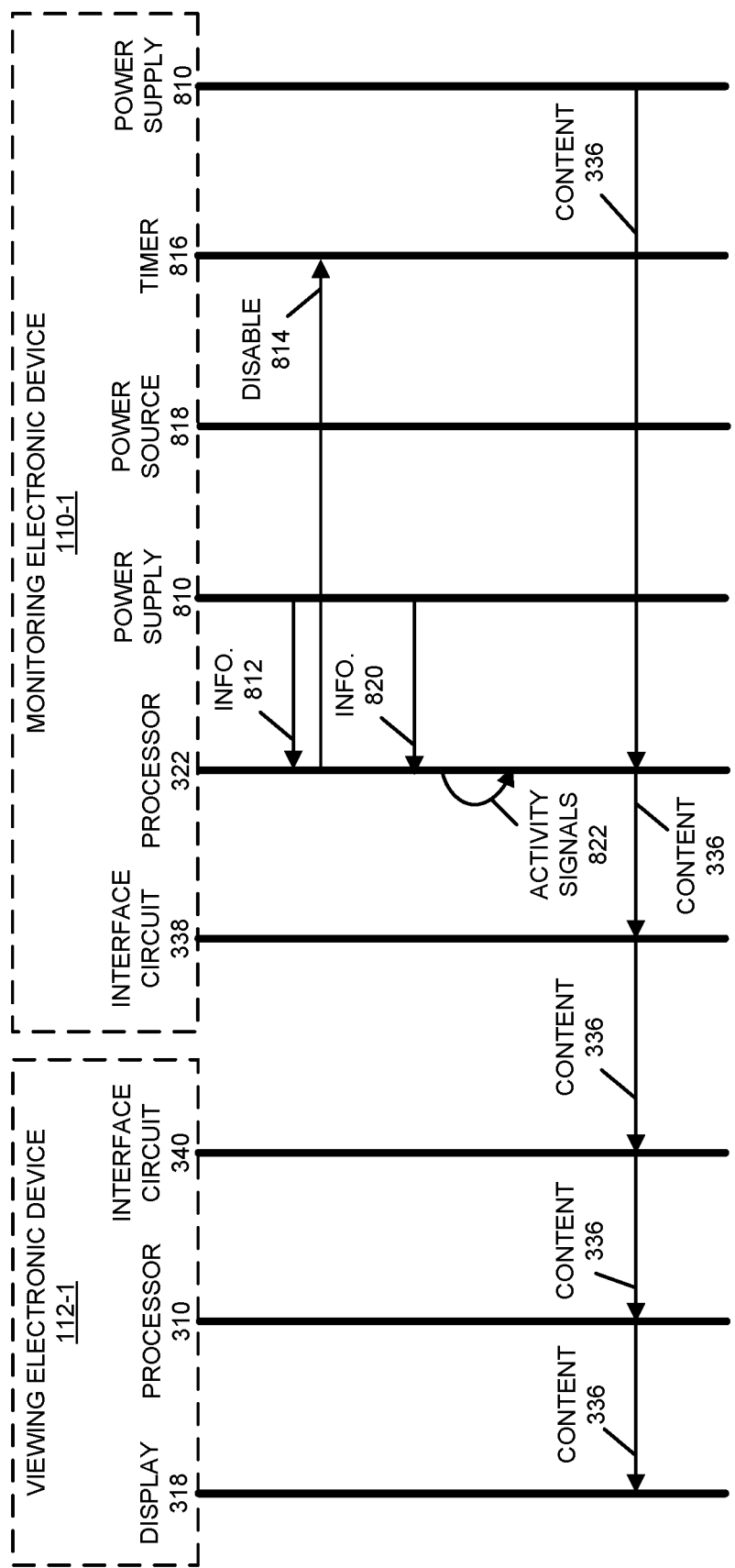
FIG. 8 is a drawing illustrating communication among at least some of the electronic devices of FIG. 1 in accordance with an embodiment of the present disclosure.

FIG. 8 presents a drawing illustrating communication among monitoring electronic device 110-1 and viewing electronic device 112-1. In particular, processor 322 executing an instance of a program module in monitoring mode may disable or restrict functions of monitoring electronic device 110-1. For example, when power supply 810 receives power from an external power source, power supply 810 may provide information 812 specifying this to processor 322. In response, processor 322 may disable 814 a timer 816 that is used to transition monitoring electronic device 110-1 to the power-saving mode when monitoring electronic device 110-1 is inactive. Alternatively, when power supply 810 receives power from internal power source 818 (such as a battery), power supply 810 may provide information 820 specifying this to processor 322. In response, processor 322 may one or more provide activity signals 822 that keep monitoring electronic device 110-1 in the monitoring mode without transitioning to the power-saving mode when monitoring electronic device 110-1 is inactive.

Subsequently, sensor(s) 334 in monitoring electronic device 110-1 may capture content 336 (such as one or more images and/or audio information corresponding to sound). For example, content 336 may be captured when an event occurs, such as a loud sound or motion is detected. Alternatively or additionally, content 336 may be captured based on an alert or a notification received from a third party, such as an insurance carrier or a governmental organization. Sensor(s) 334 may provide content 336 to processor 322, which provides it to interface circuit 338. Then, interface circuit 338 may communicate content 336 to interface circuit 340, which provides it to processor 310. Next, processor 310 may present content 336 on display 318 and/or speakers (not shown).

In these ways, the environmental monitoring technique may allow electronic devices (including legacy electronic devices) to provide continuous monitoring of the environment without transitioning to the power-saving mode. This may allow users to find new uses for older models of electronic devices and to obtain credit (for example, from insurance carriers) for the monitoring. Consequently, the improved functionality and services facilitated by the environmental monitoring technique may increase the use of the electronic devices (and, more generally, commercial activity) and may enhance customer satisfaction with the electronic device.

In an exemplary embodiment, an electronic device avoids transitioning to a power-saving mode even when the electronic device is inactive by disabling an idle timer and/or by providing activity signals (such as after a time interval, periodically, etc.). This capability may prevent the electronic device from going to sleep when it is publishing content (i.e., it is a monitoring electronic device) or subscribing or accessing content (i.e., it is a viewing electronic device). In some embodiments, the disabling of the idle timer or the providing of the activity signals may be restricted to these operations, because otherwise the battery or the internal power source in the electronic device may be drained too quickly.

Table 1 presents pseudo-code for use with an electronic device that uses an iOS operating system (from Apple, Inc., Cupertino, Calif.), and Table 2 presents pseudo-code for use with an electronic device that uses an Android operating system (from Alphabet, Inc., Mountain View, Calif.).

TABLE 1

/ In order to stop the app from going to sleep:
[UIApplication sharedApplication].idleTimerDisabled = YES;
/ This will disable the idle timer and stop the electronic
device from automatically going
into sleep mode.
/ In order to re-allow the phone to go into sleep mode use the following:
[UIApplication sharedApplication].idleTimerDisabled = NO;
/ This will re-enable the idle timer and the phone can go back to sleep
/ In order to disable stand-by mode:
[[UIApplication sharedApplication] setIdleTimerDisabled:YES];
/In order to enable stand-by mode:
[[UIApplication sharedApplication] setIdleTimerDisabled:NO];

TABLE 2

/ Wake_Lock provides the ability for an application to control the power state of the
electronic device. In order to utilize the Wake_Lock capabilities the Wake_Lock TABLE 2-continued

```
permission must be added to the manifest file of the application:
<uses-permission android:name="android.permission.WAKE_LOCK" />
/ In order to remove/release the Wake_Lock capability:
wakelock.release( ).
/ In order to keep the screen on:
getWindow( ).addFlags(WindowManager.LayoutParams.FLAG_KEEP_SCREEN_ON);
/ In order to allow the screen to turn off again:
getWindow( ).clearFlags(WindowManager.LayoutParams.FLAG_KEEP_SCREEN_ON);
```

In some embodiments, when the application is turned on, standby mode is disabled so the monitoring electronic device does not lock and sleep mode is disabled so the screen or display does not turn off. (Note that, because sleep mode can disable the application functionality until the electronic device is awakened or unlocked, it may be useful to disable sleep mode or automatic locking modes on the electronic device.) Then, while the application is running or executing, if the monitoring electronic device is unplugged from an external power source, the screen may be dimmed to the lowest possible setting to conserve power and/or the sleep mode may be re-enabled.

Moreover, when the application is turned on and running or executing, a series of subroutines may execute. In particular, if no motion is detected for a period of time, a face-recognition technique does not identify anyone for a second period of time and/or the monitoring electronic device is unplugged from an external power source, then the screen may be dimmed to the lowest possible setting to conserve power and/or the sleep mode may be re-enabled. Alternatively or additionally, if video conferencing between paired electronic devices has concluded, then the screen may be dimmed to the lowest possible setting to conserve power and/or the sleep mode may be re-enabled. Furthermore, if a sound is detected in the environment or video conferencing between paired electronic devices has begun, the screen may be turned on, sleep mode may be disabled, and/or standby mode may be disabled.

Additionally, when the application is running, if no motion is detected, no action may be taken. However, if motion is detected, a face-recognition technique may be used to determine if a familiar or known face is detected. If yes, the user of the viewing electronic device may be notified about who has entered the environment. Alternatively, if a familiar face is not detected, the user of the viewing electronic device may be notified that motion was detected in the environment. Moreover, the monitoring electronic device may be panned or scanned from an initial position over a counterclockwise arc of 180°, and then may be panned or scanned from the initial position over a clockwise arc of 180°. Afterwards, the monitoring electronic device may be restored to the initial position. Furthermore, the captured video may be saved or stored on the monitoring electronic device, and then may be communicated to the user of the viewing electronic device (e.g., using email).

Note that for monitoring electronic devices that support simultaneous video capture from the front and back cameras, the application may stream both videos concurrently if the user selects both as inputs. Alternatively, if motion is detected using one of the cameras, streaming video from both cameras may be enabled. This feature may be used when the monitoring electronic device is placed in a dock and/or when the dock pans or scans the camera(s) by rotating about an axis.

However, for monitoring electronic devices that do not support simultaneous video capture from the front and back cameras, a multiplexing technique (or one or more in a set of multiplexing techniques) may be used. For example, every other frame of video may be captured with a particular camera (such as a first frame from the front camera, then a second frame from the back camera, etc.). Alternatively, every N frames of video may be captured with a particular camera (such as ten frames from the front camera, then ten frames from the back camera, etc.). In some embodiments, M frames of video may be captured with one camera, and the N frames of video may be captured with the other camera, where M is less than N. Thus, five frames may be captured from the front camera, then ten frames may be captured from the back camera, etc. This multiplexing technique may be useful when one camera has a higher frame rate than the other (in which case, the higher frame-rate camera may be used to capture the M frames).

Figure 9:
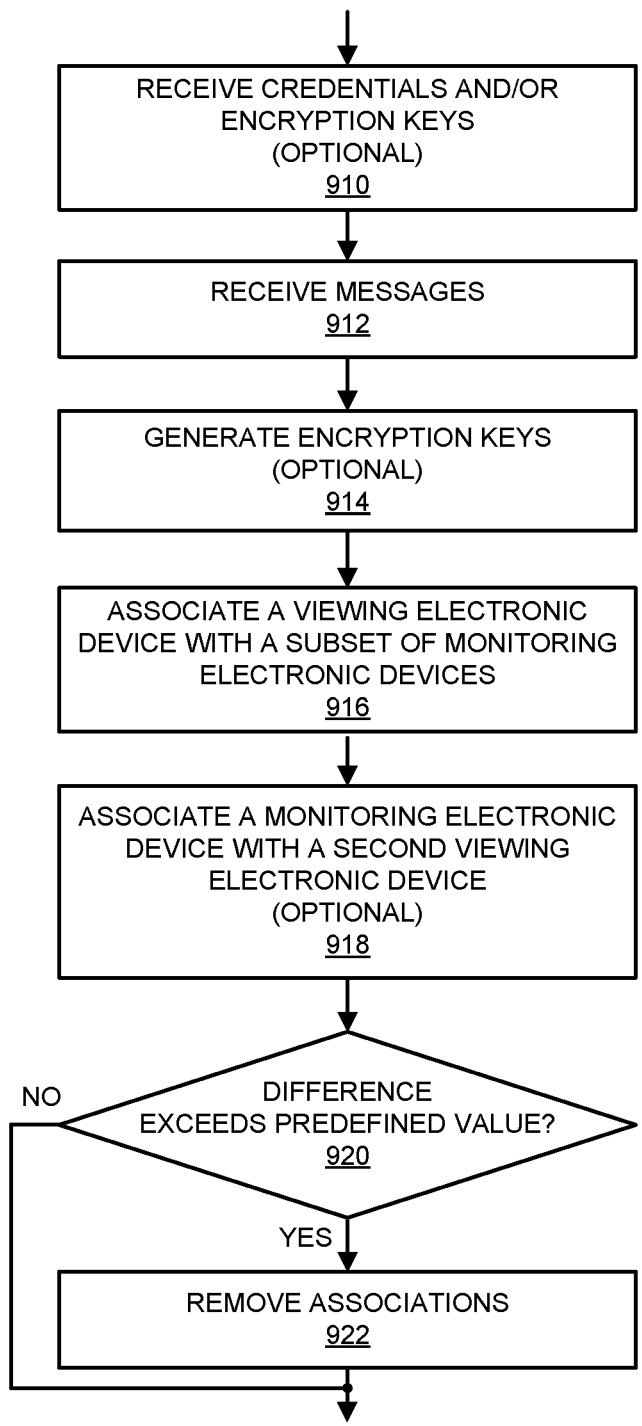
FIG. 9 is a flow diagram illustrating a method for facilitating environmental monitoring in FIG. 1 in accordance with an embodiment of the present disclosure.

FIG. 9 presents a flow diagram illustrating a method 900 for facilitating environmental monitoring in FIG. 1, which may be performed by a controller electronic device (such as controller electronic device 118 in FIG. 1). During operation, the controller electronic device receives messages (operation 912) that include timestamps and current locations of a monitoring electronic device. For example, monitoring electronic device may periodically or after a time interval transmit the messages (which function as beacons).

Then, the controller electronic device associates a viewing electronic device (which is paired with or associated with the monitoring electronic device) with a subset of second monitoring electronic devices (operation 916) based on a duration of time that the monitoring electronic device is approximately at a fixed location (such as within 1-100 m of a previous location for at least 1-72 hours). Note that a size of the subset increases as the duration of time increases, and the associations allow the viewing electronic device to selectively access content, including acoustic information and images for second environments that include the subset of the second monitoring electronic devices, from the subset of the second monitoring electronic devices. For example, the subset of the second monitoring electronic devices may be located within a distance from the fixed location, and the distance may increase as the duration of time increases. Thus, after a day, the electronic device may be associated with the subset of the second monitoring electronic devices those that are within 50 m, after two days, the electronic device may be associated with the subset of the second monitoring electronic devices that are within 100 m, etc. Alternatively or additionally, the subset of the second monitoring electronic devices may be located within an adjacency value from the fixed location (such as nearest neighbors, next-nearest neighbors, etc.), and the adjacency value may increase as the duration of time increases.

In some embodiments, the controller electronic device optionally receives credentials (such as a username, a password and/or an identifier) (operation 910) from the viewing electronic device and the subset of the second monitoring electronic devices, and associating the viewing electronic device and the subset of the second monitoring electronic devices (operation 916) may involve providing the credentials to the viewing electronic device and the subset of the second monitoring electronic devices. Additionally, the controller electronic device may optionally receive encryption keys (operation 910) from the viewing electronic device and the subset of the second monitoring electronic devices, and associating the viewing electronic device and the subset of the second monitoring electronic devices (operation 916) may involve providing the encryption keys to the viewing electronic device and the subset of the second monitoring electronic devices. In some embodiments, the controller electronic device optionally generates the encryption keys (operation 914) for the viewing electronic device and the subset of the second monitoring electronic devices, and associating the viewing electronic device and the subset of the second monitoring electronic devices (operation 916) may involve providing the encryption keys to the viewing electronic device and the subset of the second monitoring electronic devices. Note that, in general, the credentials and the encryption keys may be used by viewing electronic devices to selectively access content, such as from a monitoring electronic device and/or from a cloud-based storage device.

Moreover, the controller electronic device may optionally associate the monitoring electronic device with a second viewing electronic device (operation 918) that is associated with one of the second monitoring electronic devices. The association between the monitoring electronic device with the second viewing electronic device may allow the second viewing electronic device to selectively access content, including images and acoustic information corresponding to sound, for the environment. Furthermore, the controller electronic device may optionally receive credentials (operation 910) from the monitoring electronic device and the second viewing electronic device, and associating the monitoring electronic device and the second viewing electronic device (operation 918) may involve providing the credentials to the monitoring electronic device and the second viewing electronic device. Additionally, the controller electronic device may optionally receive encryption keys (operation 910) from the monitoring electronic device and the second viewing electronic device, and associating the monitoring electronic device and the second viewing electronic device (operation 918) may involve providing the encryption keys to the monitoring electronic device and the second viewing electronic device. In some embodiments, the controller electronic device optionally generates the encryption keys (operation 914) for the monitoring electronic device and the second viewing electronic devices, and associating the monitoring electronic device and the second viewing electronic device involves providing the encryption keys (operation 918) to the monitoring electronic device and the second viewing electronic device.

Furthermore, when a difference between a current location of the monitoring electronic device and the fixed location exceeds a predefined value (operation 920), the controller electronic device removes the associations (operation 922).

By receiving the messages and associating the viewing electronic device with the subset of the second monitoring electronic devices, the controller electronic device may establish selective access to the content when the viewing electronic device is outside of communication range with the subset of the monitoring electronic devices. For example, this association technique may allow the viewing electronic device to selectively access content even when the viewing electronic device is outside of direct, wireless communication range with the subset of the monitoring electronic devices.

Figure 10:
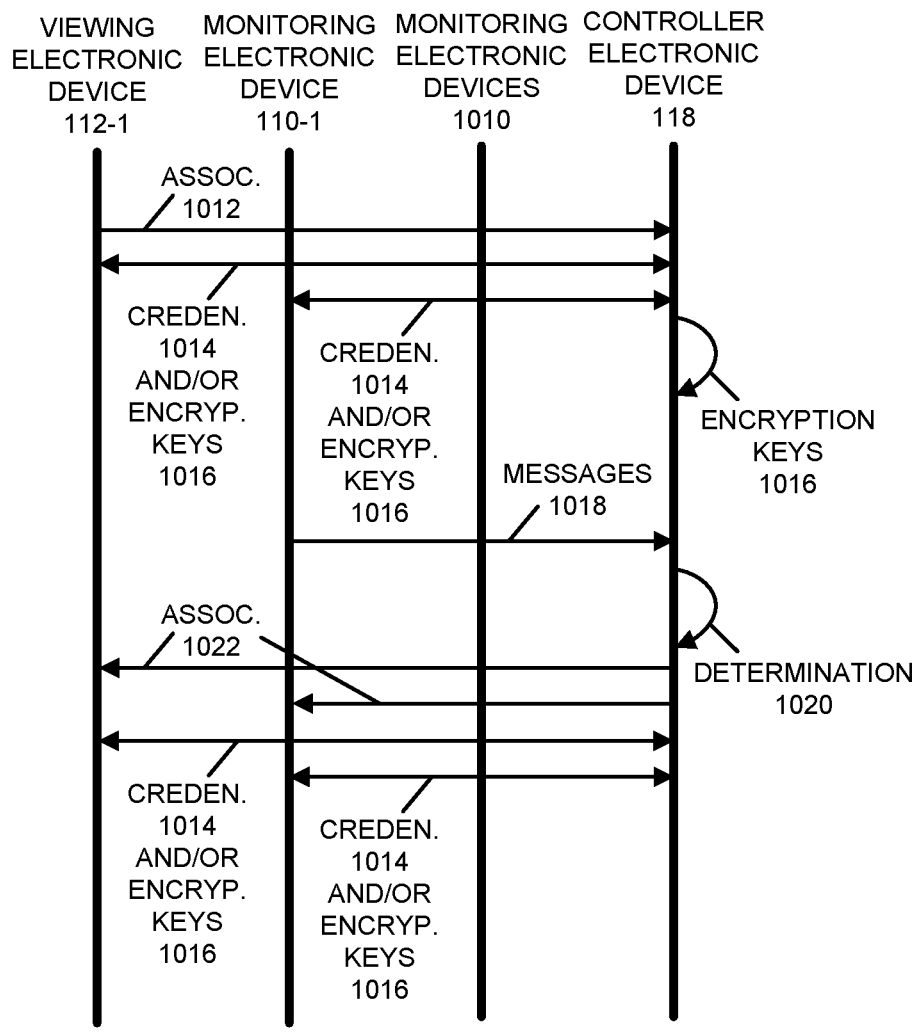
FIG. 10 is a drawing illustrating communication among at least some of the electronic devices of FIG. 1 in accordance with an embodiment of the present disclosure.

FIG. 10 presents a drawing illustrating communication among monitoring electronic device 110-1, monitoring electronic devices 1010, viewing electronic device 112-1 and controller electronic device 118. In particular, a user of viewing electronic device 112-1 may set up or define an association 1012 (or pairing) in controller electronic device 118 between monitoring electronic device 110-1 and viewing electronic device 112-1. Note that controller electronic device 118 may confirm the association based on a predefined list of electronic devices associated with or used by the user. When the association is defined, credentials 1014 and/or encryption keys 1016 may be exchanged between controller electronic device 118, monitoring electronic device 110-1 and viewing electronic device 112-1. In some embodiments, controller electronic device 118 generates encryption keys 1016.

Subsequently, monitoring electronic device 110-1 may provide messages 1018 with timestamps and locations of monitoring electronic device 110-1. If controller electronic device 118 determines 1020 that monitoring electronic device 110-1 has remained at location for a time interval, controller electronic device 118 may define associations 1022 between viewing electronic device 112-1 and a subset of monitoring electronic devices 1010 (which are at locations other than the location). This may optionally include providing messages to viewing electronic device 112-1 and the subset of monitoring electronic devices 1010 informing these electronic devices of the association or pairing. When the associations are defined, credentials 1014 and/or encryption keys 1016 may be exchanged between controller electronic device 118, the subset of monitoring electronic devices 1010 and viewing electronic device 112-1. Moreover, as the time interval monitoring electronic device 110-1 remains at the location increases, the spatial extent of the subset of monitoring electronic devices 1010 may increase.

In this way, over time viewing electronic device 112-1 may be able to selectively access content (such as images and/or audio information) from an ever increasing number of monitoring electronic devices having an ever increasing spatial extent. However, if controller electronic device 118 determines that monitoring electronic device 110-1 is no longer at location 1020, controller electronic device 118 may discontinue 1020 associations 1022 between viewing electronic device 112-1 and the subset of monitoring electronic devices 1010 (but the association between monitoring electronic device 110-1 and viewing electronic device 112-1 may be maintained).

Figure 11:
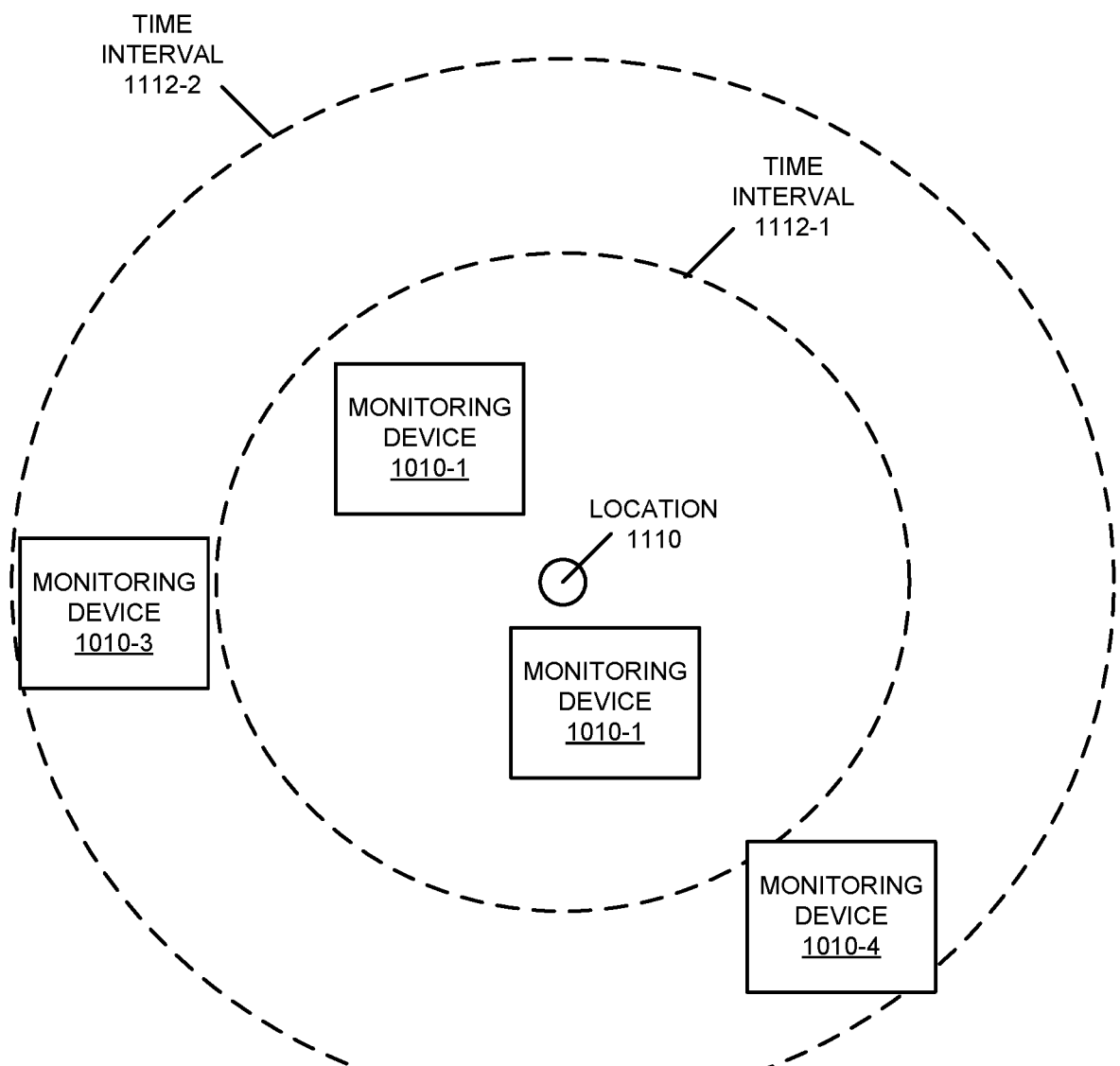
FIG. 11 is a drawing illustrating association of at least some of the electronic devices of FIG. 1 in accordance with an embodiment of the present disclosure.

The dynamic associations are shown in FIG. 11, which presents a drawing illustrating association of viewing electronic device 112-1 and monitoring electronic devices 1010 as a function of time. In particular, if monitoring electronic device 110-1 remains at location 1110 for time interval 1112-1, viewing electronic device 112-1 may be associated with monitoring electronic devices 1010-1 and 1010-2. For example, if monitoring electronic device 110-1 remains within 10 m of location 1110 for 12 hours, viewing electronic device 112-1 may be associated with monitoring electronic devices 1010-1 and 1010-2 (which are within 50 m of location 1110). Alternatively, after 12 hours the associations may include nearest neighbors of monitoring electronic device 110-1, and after the associations may include nearest neighbors and next-nearest neighbors of monitoring electronic device 110-1.

Then, if monitoring electronic device 110-1 remains at location 1110 for time interval 1112-2, viewing electronic device 112-1 may be associated with monitoring electronic devices 1010-1, 1010-2, 1010-3 and 1010-4. For example, if monitoring electronic device 110-1 remains within 10 m of location 1110 for 24 hours, viewing electronic device 112-1 may be associated with monitoring electronic devices 1010-1 and 1010-2 (which are within 50 m of location 1110) and monitoring electronic devices 1010-3 and 1010-4 (which are within 50 m of location 1110).

Thus, the size of the subset may increase as the duration of the time interval increases, and the associations may allow viewing electronic device 112-1 to selectively access content from the subset of monitoring electronic devices 1010 (including acoustic information corresponding to sound and images for environments that include the subset of monitoring electronic devices 1010). Consequently, the longer a cellular telephone executing the program module in the monitoring mode is at a particular location and active, the wider the information network that is shared with the user of this cellular telephone. In an exemplary embodiment, after a day the user can selectively access content from their neighbors, after a week the user can selectively access content from their entire neighborhood, and after a year the user can selectively access content from their entire town. Furthermore, when the cellular telephone is moved (such as more than 1-100 m), the associations may reset.

This dynamic-association feature may prevent or make it more difficult for someone briefly visiting a neighborhood in an attempt to establish associations or pairings for illicit purposes. Instead, a user may be rewarded with an ever-expanded information network based on stability of the geolocation of their monitoring electronic device and/or their viewing electronic device. Moreover, by using one or more controller electronic devices to facilitate the dynamic associations, this association technique may provide a low-friction (i.e., low user effort) approach for building an information network for a user, and such a low-friction approach can make it easier for a user to use and enjoy the information network.

Figure 12:
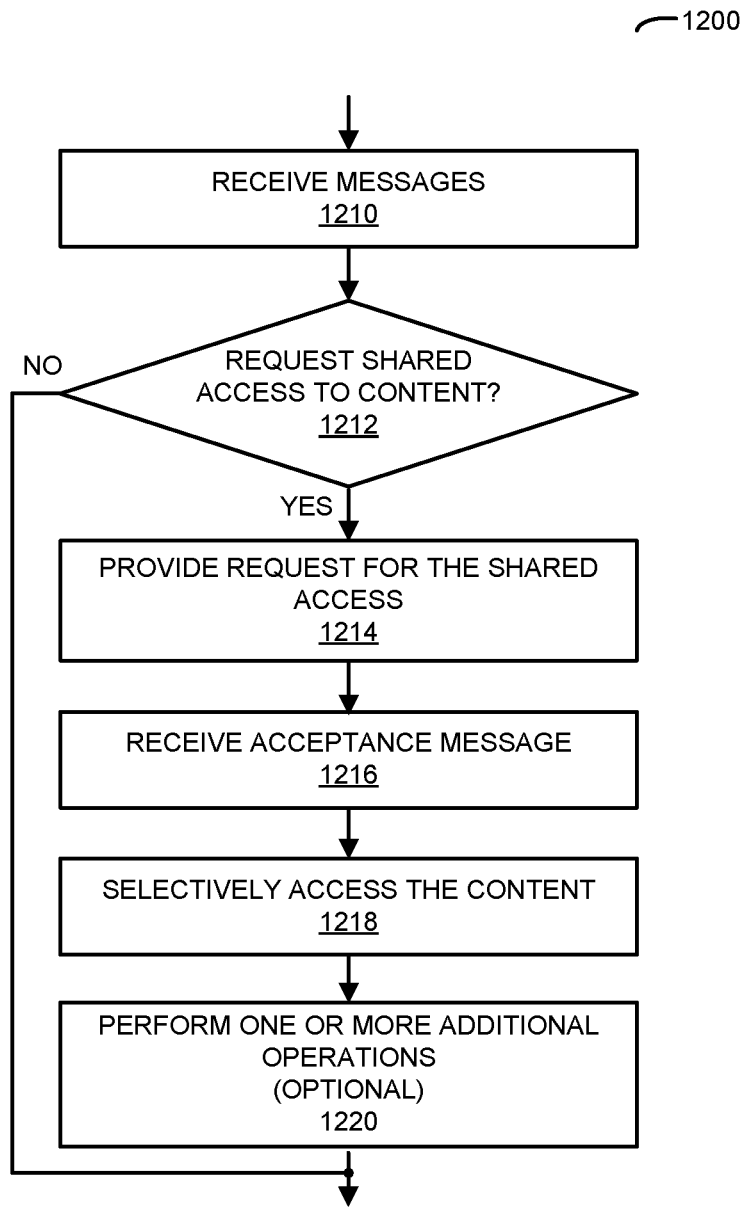
FIG. 12 is a flow diagram illustrating a method for facilitating environmental monitoring in FIG. 1 in accordance with an embodiment of the present disclosure.

FIG. 12 presents a flow diagram illustrating a method 1200 for facilitating environmental monitoring in FIG. 1, which may be performed by an electronic device (such as one of viewing electronic devices 112 in FIG. 1). During operation, the electronic device (which may execute an instance of a program module in a viewing mode, and thus may be referred to as a 'viewing electronic device') receives messages (operation 1210) from a second electronic device executing another instance of the program module. These messages advertise availability of content for an environment at a location associated with the second electronic device (e.g., the messages may indicate that the second electronic device is executing the other instance of the program module), and the content includes images of the environment and acoustic information corresponding to sound in the environment. For example, the environment may include the second electronic device and the second electronic device may execute the instance of the program module in a monitoring mode (and thus may be referred to as a 'monitoring electronic device') to collect the content. Alternatively, the second electronic device may execute an instance of the program module in the viewing mode and the content may be collected by a monitoring electronic device at the location that executes an instance of the program module in the monitoring mode, and which is paired or associated with the second electronic device.

Then, the electronic device determines whether to request shared access to the content (operation 1212) based on the location and locations of one or more monitoring electronic devices executing additional instances of the program module in a monitoring mode for which the electronic device already has shared access. For example, the location may be different than any of the locations. Moreover, the determination may be based on a history of locations of the electronic device. In particular, the history of the locations may indicate that the electronic device was proximate to the location for more than: a predefined number of occasions (such as at least 2-10 times); and/or a predefined time duration (such as at least 5-60 min).

Next, the electronic device provides, to the second electronic device, a request for shared access (operation 1214) based on the determination. Furthermore, the electronic device receives an acceptance message (operation 1216) from the second electronic device in response to the request, and the electronic device selectively accesses the content (operation 1218) based on the acceptance message. For example, the acceptance message may include credentials and/or an encryption key that facilitate the selective access.

In some embodiments, the electronic device optionally performs one or more additional operations (operation 1220). For example, while in the viewing mode, the electronic device may selectively access second content for a second environment at one of the locations that is collected by a monitoring electronic device executing an instance of the program module in the monitoring mode and that is associated or paired with the electronic device. Note that the second content may include images of the second environment and acoustic information corresponding to sound in the second environment. Moreover, the electronic device may provide, to the second electronic device, access to the second content in response to the acceptance message. Note that providing access to the second content may involve providing, to the second electronic device, credentials and/or an encryption key that facilitate the selective access.

By providing the request and receiving the acceptance message, the electronic device may establish selective access to the content when the electronic device is outside of communication range with the monitoring electronic device at the location. For example, the electronic device may establish selective access to the content when the electronic device is outside of direct, wireless communication range with the monitoring electronic device at the location. Moreover, the instances of the program module executed by the electronic device and the second electronic device may help authenticate or facilitate recognition of suitable electronic devices with which to associate.

Figure 13:
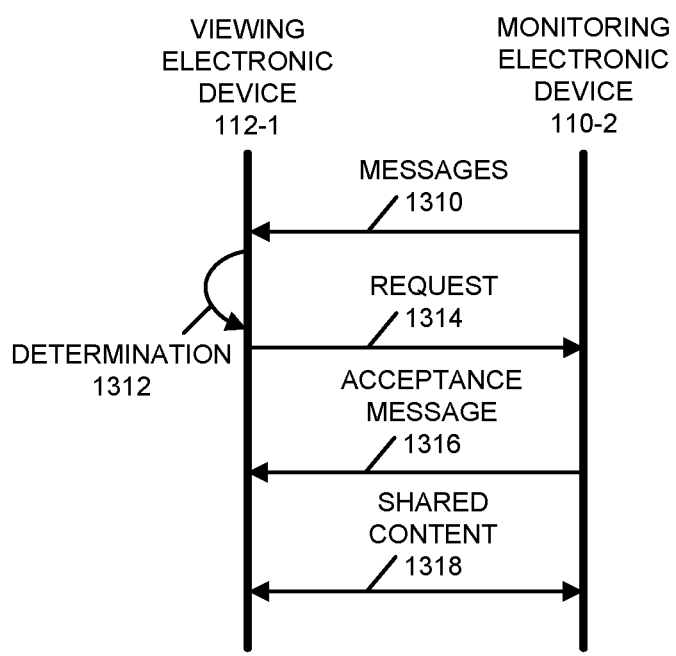
FIG. 13 is a drawing illustrating communication among at least some of the electronic devices of FIG. 1 in accordance with an embodiment of the present disclosure.

FIG. 13 presents a drawing illustrating communication among viewing electronic device 110-1 and monitoring electronic device 110-2. In particular, viewing electronic device 110-1 may receive one or more messages 1310 from monitoring electronic device 110-2. These messages may advertise the availability of content 1318 for an environment at a location associated with monitoring electronic device 110-2. In response, viewing electronic device 110-1 may determine 1312 whether to request shared access to content 1318.

Based on determination 1312, viewing electronic device 110-1 may request 1314 shared access to content 1318. In response, monitoring electronic device 110-2 may provide an acceptance message 1316. This acceptance message may include credentials and/or an encryption key that facilitates the shared access to content 1318. Next, viewing electronic device 110-1 may selectively access content 1318.

In this way, viewing electronic device 112-1 may be able to selectively access content (such as images and/or audio information) from monitoring electronic devices that are of interest to a user of viewing electronic device 112-1, e.g., based on the history of locations of viewing electronic device 112-1 and, in particular, how often and how long viewing electronic device 112-1 is at or proximate to the location of monitoring electronic device 110-2.

Figure 14:
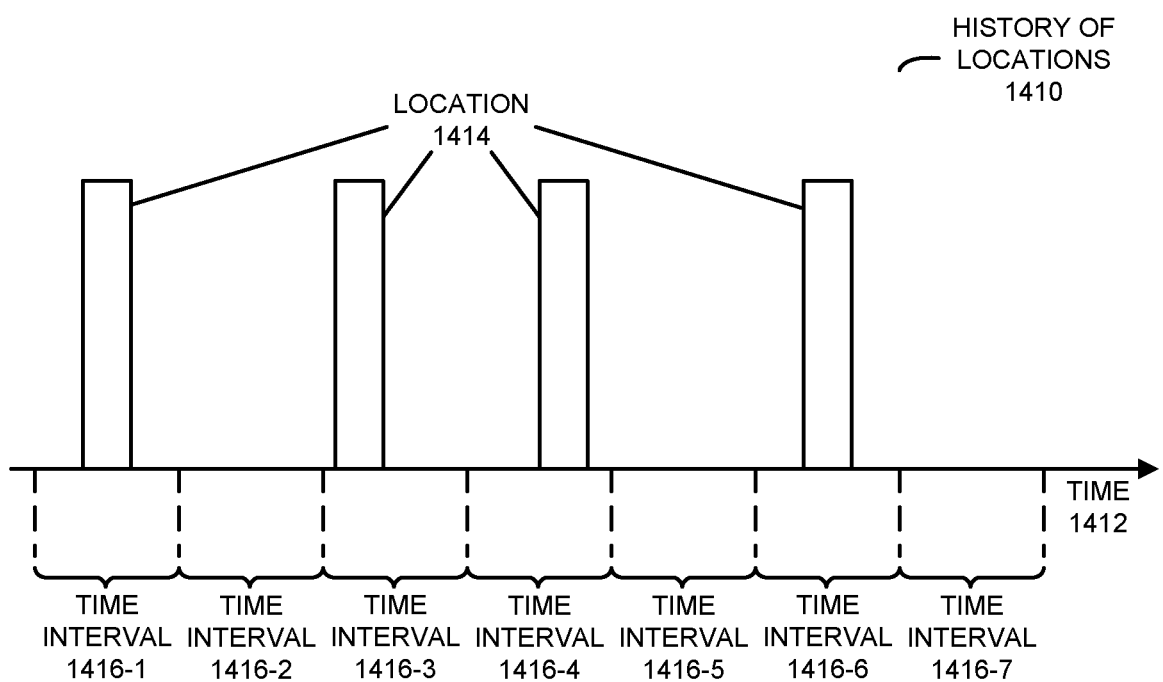
FIG. 14 is a drawing illustrating requesting shared access to content between at least some of the electronic devices of FIG. 1 in accordance with an embodiment of the present disclosure.

This association technique is further shown in FIG. 14, which presents a drawing illustrating requesting shared access to content between viewing electronic device 110-1 and monitoring electronic device 110-2. In particular, history of locations 1410 of viewing electronic device 110-1 as a function of time 1412 shows that viewing electronic device 110-1 repeatedly visits location 1414 of monitoring electronic device 110-2 and that the duration or sum of time intervals 1416 during which viewing electronic device 110-1 is proximate to location 1414 exceeds a predefined value. For example, viewing electronic device 110-1 may be at or proximate to location 1414 at least 2-10 times and/or may have a predefined time duration at or proximate to location 1414 of at least 5-60 min. When either or both of these criteria are achieved, viewing electronic device 110-1 may request to associate or pair with monitoring electronic device 110-2 so that it can selectively access the content. This approach may help ensure that there are only associations that are of interest to the user of viewing electronic device 110-1. It may also allow the user to auto-complete an emergency list or a contact list based on their activities (such as the locations they visit), which may indicate the individuals that are most important to them.

Figure 15:
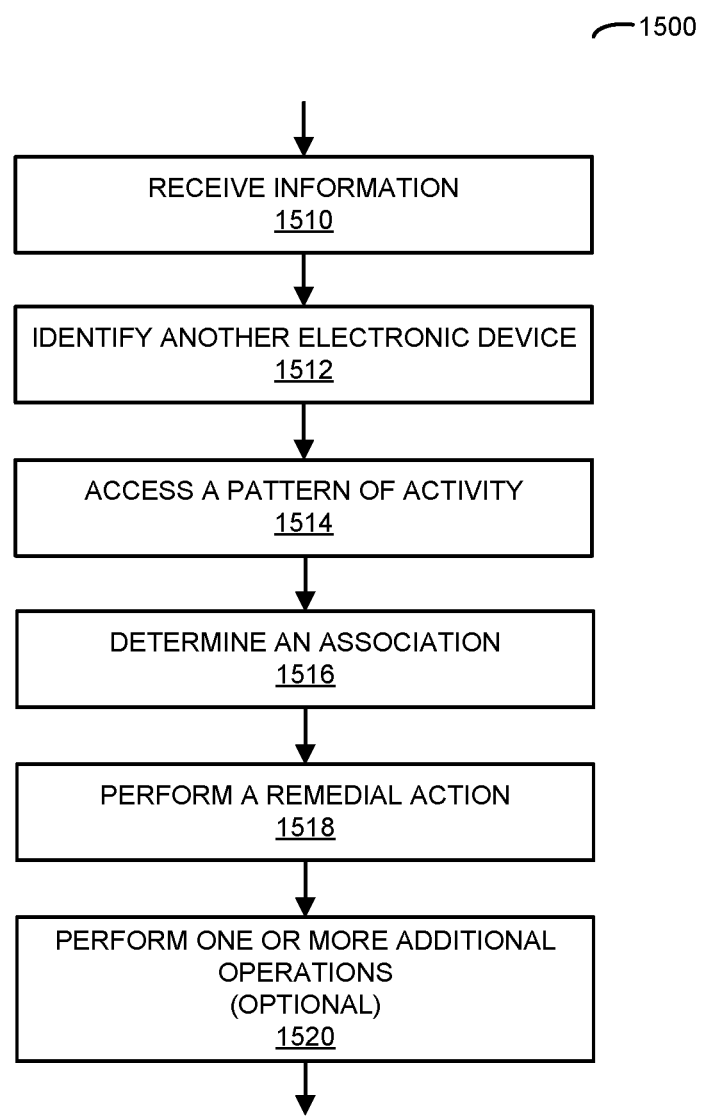
FIG. 15 is a flow diagram illustrating a method for providing a notification in FIG. 1 in accordance with an embodiment of the present disclosure.

In some embodiments, a monitoring technique is used to provide situational awareness in an environment proximate to an electronic device. This is shown in FIG. 15, which presents a flow diagram illustrating a method 1500 for providing a notification. This method may be performed by an electronic device (such as one of monitoring electronic devices 110 or viewing electronic devices 112 in FIG. 1, or another electronic device that may be included in FIG. 1). During operation, the electronic device may receive information (operation 1510) associated with another electronic device that is proximate to the electronic device. For example, the electronic device may receive the information by wirelessly communicating with the other electronic device when the other electronic device is in wireless range of the electronic device, such as when the other electronic device is in an environment that includes the electronic device or when the other electronic device is within a distance between 1 and 100 ft of the electronic device.

Then, the electronic device may identify the other electronic device (operation 1512) based on an identifier that is included in the information that is associated with the other electronic device. For example, the information may include a MAC address of the other electronic device, may specify a cellular-telephone number of the other electronic device, may indicate a serial number of an application that is installed on the other electronic device (so that the other electronic device is deemed 'friendly' or 'trusted'), etc.

Moreover, the electronic device may access a pattern of activity (operation 1514) for a region that includes the electronic device (such as a building, a neighborhood, a street, a house, etc.), where the pattern of activity includes events, timestamps and identifiers of one or more electronic devices in the region during the events. For example, the events may include reported criminal activity, a type of service (such as food delivery, gardening, snow removal, package delivery, home healthcare, cleaning, maintenance, etc.), routine neighborhood activity (such as a neighbor walking their dog, an animal wandering through a yard, a child playing, a homeowner's car or a neighbor's car parking, a neighbor working in their yard or garden), etc. Note that the pattern of activity may be associated with a time interval, such as the last 24 hours, the last week, the last month, the last six months, another time interval (e.g., a time interval that includes a previous instance of a type of service or a type of event), etc.

Next, the electronic device may determine an association (operation 1516) between the other electronic device and at least one of the events based on the pattern of activity. In some embodiments, the association includes a statistical association. Thus, the determination may involve one or more instances of a type of event where the other electronic device is identified in proximity to the electronic device.

Furthermore, the electronic device may provide the notification (operation 1518) based on the determined association. For example, the notification may be or may include an alert that is emailed or sent by text message to a second electronic device of user of the electronic device or a second electronic device of a recipient designated by a user of the electronic device, or a notification in an application or on website associated with a service provided to a user of the electronic device. Alternatively or additionally, the notification may be provided to a computer associated with security or law enforcement. Thus, the notification may include information specifying the second electronic device. In some embodiments, the notification includes a message displayed on the electronic device or an audio message or sound that is output by the electronic device.

In some embodiments, the electronic device optionally performs one or more additional operations (operation 1520). For example, accessing the pattern of activity (operation 1514) may involve the electronic device: providing, via the interface circuit, a request for a computer for the pattern of activity; and receiving, via the interface circuit, a response associated with the computer with the pattern of activity. Alternatively, the pattern of activity may be accessed in local memory of the electronic device.

Moreover, the notification may include a recommendation that the other electronic device be allowed to pair, connect and/or associate with a wireless network (such as a wireless local area network) in the region based on a repeated presence of the other electronic device in the region (and, more generally, based on device familiarity). Alternatively, or additionally, the recommendation may be based on other factors, such as benign conditions observed when that device is in the area. Similarly, the converse may be true, in which case a notification may be sent to recommend that the other electronic device not be allowed to pair or otherwise connect. Indeed, in some embodiments the other electronic device may be presumptively and automatically excluded from pairing or connecting, while optionally enabling the owner of the electronic device or an administrator of the network to override the exclusion. If the user or the recipient approves the recommendation, the electronic device may perform pairing, establish a connection and/or may associated the other electronic device with the wireless network.

In some embodiments, the notification includes a recommendation that the other electronic device be added to an emergency call list of a user of the electronic device based on a repeated presence of the other electronic device in the region. If the user or the recipient approves the recommendation, the electronic device may add the other electronic device to the emergency call list of the user. For example, the electronic device may then provide a future notification to the other electronic device.

Figure 16:
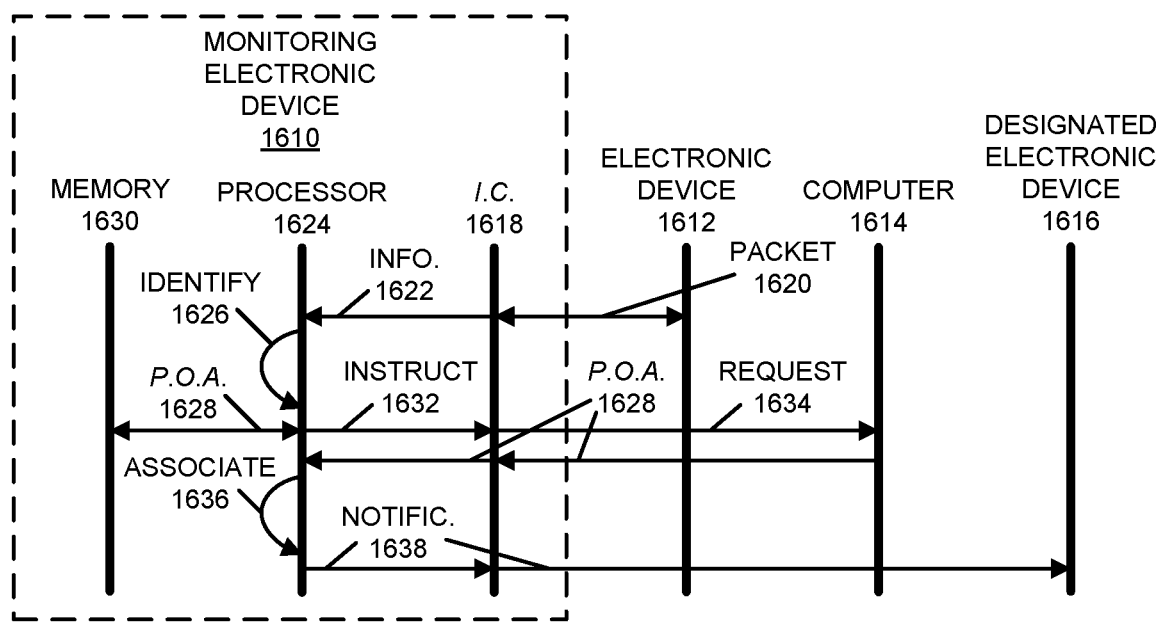
FIG. 16 is a drawing illustrating communication among at least some of the electronic devices of FIG. 1 in accordance with an embodiment of the present disclosure.

FIG. 16 presents a drawing illustrating communication among a monitoring electronic device 1610, an electronic device 1612, a computer 1614 and a designated electronic device 1616. During the monitoring technique, interface circuit (I.C.) 1618 in monitoring electronic device 1610 may wireless communicate wireless signals (such as a wires signals corresponding to a packet 1620 or a frame) with electronic device 1612 (such as a portable electronic, e.g., a cellular telephone). Then, interface circuit 1618 may provide information (info.) 1622 included in packet 1620 to processor 1624 in monitoring electronic device 1610.

Next, processor 1624 may identify 1626 electronic device 1612 based on an identifier that is included in information 1622. Moreover, processor 1624 may access a pattern of activity (P.O.A.) 1628 for a region that includes electronic device 1610. For example, processor 1624 may access pattern of activity 1628 in memory 1630 in monitoring electronic device 1610. Alternatively or additionally, processor 1624 may instruct 1632 interface circuit 1618, which requests 1634 and then receives the pattern of activity 1628 from computer 1614 (such as a computer associated with a local government, a police department, a neighborhood watch, etc.).

Furthermore, processor 1624 may determine an association 1636 between electronic device 1612 and at least one of the events based on the pattern of activity 1628. For example, processor 1624 may match the identifier to one or more of the identifiers associated with the events in the pattern of activity 1628.

Furthermore, processor 1624 may provide notification (notific.) 1638 to interface circuit 1618 based on the determined association 1636, which provides notification 1638 to designated electronic device 1616. More generally, based on the determined association 1636, processor 1624 may perform a remedial action, such as sounding an alarm, calling the police, etc.

In some embodiments, notification 1638 includes a recommendation that electronic device 1612 be allowed to pair, connect and/or associate with a wireless network (such as a wireless local area network) in the region or an environment that includes or is associated with monitoring electronic device 1610 based on a repeated presence (such as two or more instance) of electronic device 1612 in the region or the environment. If a user or a recipient associated with designated electronic device 1616 approves the recommendation, monitoring electronic device 1610 may perform the pairing, establish a connection and/or may associated electronic device 1612 with the wireless network.

Alternatively or additionally, notification 1638 may include a recommendation that electronic device 1612 be added to an emergency call list of a user of electronic device 1610 based on a repeated presence of electronic device 1612 in the region. If the user or the recipient approves the recommendation, electronic device 1610 may add electronic device 1612 to the emergency call list of the user. For example, electronic device 1610 may then provide a future notification to electronic device 1612. Note that instead of an emergency call list, a notification list can be used. The notification list may include a list of at least one user who can receive notifications via a mobile application, an email, a text message, or other alert.

In some embodiments, the monitoring technique allows the electronic device (such as the monitoring electronic device) to electronically (such as wirelessly) monitor an environment (such as a geographic region, a house, an apartment, at least a portion of a building, etc.), which is proximate to the electronic device (such as within wireless range of the electronic device) and that is within the region, for potential threats or particular patterns of activity, behavior or types of events. More generally, the monitoring technique may allow the electronic device to detect patterns of activity or changes in patterns of activity in the environment. For example, the monitoring technique may determine an identifier of a service provider that provided a service (such as package delivery, gardening, house cleaning, food delivery, home healthcare, etc.), which may allow a quality of the service fulfillment to be associated with specific service providers. Alternatively or additionally, the electronic device may recommend, based on the repeated presence of the identifier during the events, that the other electronic device be allowed to pair, connect and/or associate with a wireless network in the environment. In these ways, the monitoring technique may provide situational awareness to the user or the designated recipient when the user or the designated recipient is in the environment or even when the user or the designated recipient is not present in the environment. This situational awareness may allow the user or the designated recipient to make informed decisions regarding potential threats, service quality, etc. These decisions may be aided by a recommendation engine that performs the situational analysis for the user and, if the user chooses, that optionally may effectively make and implement the decision for the user based on this analysis. Consequently, the monitoring technique may facilitate dynamic electronic monitoring of the environment, which may provide individuals with more control over the environment and peace of mind.

Figure 17:
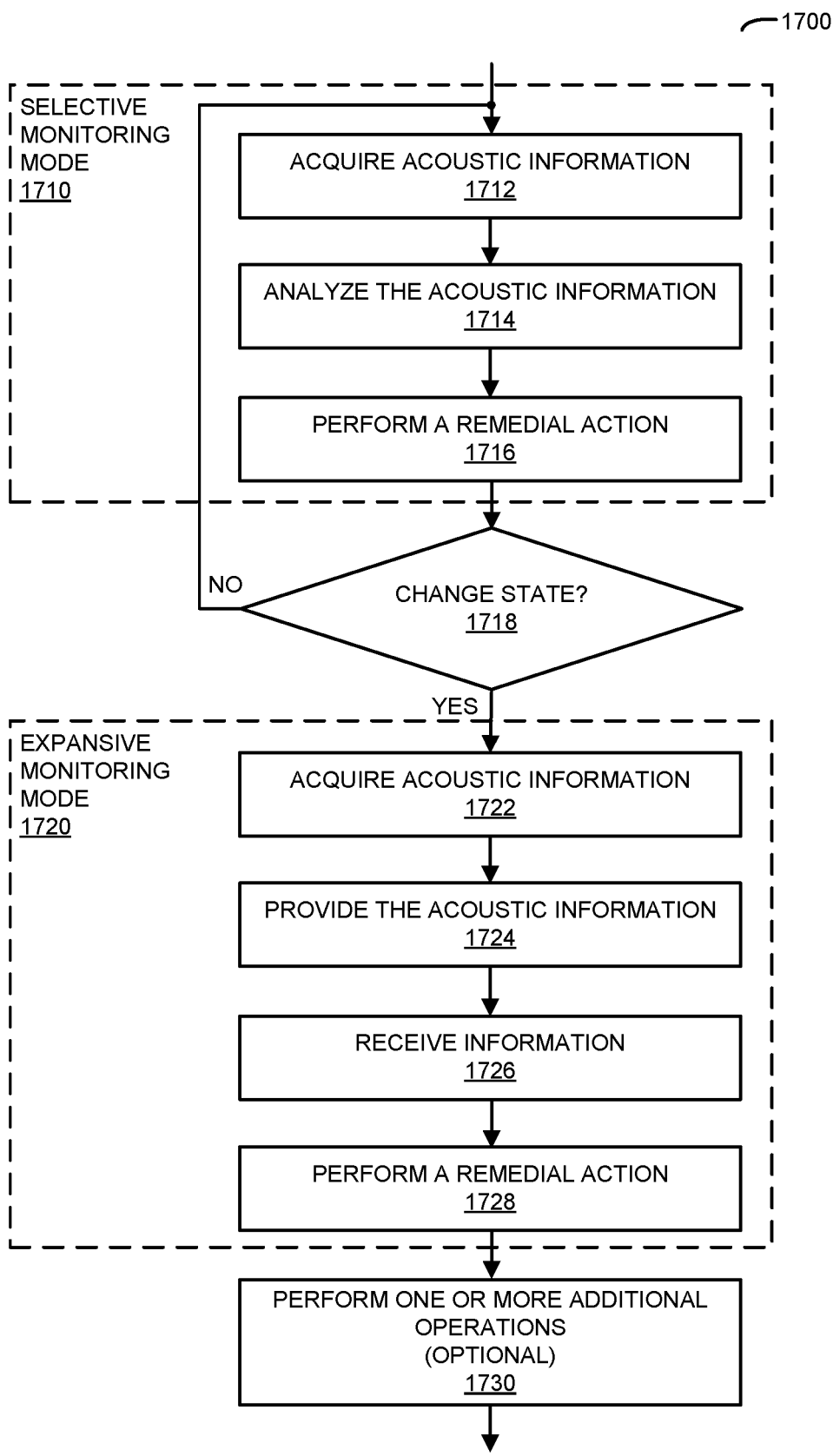
FIG. 17 is a flow diagram illustrating a method for operating in a selective monitoring mode and an expansive monitoring mode in FIG. 1 in accordance with an embodiment of the present disclosure.

In some embodiments, a monitoring technique is used to selectively monitor an environment proximate to an electronic device or a region that includes the electronic device. FIG. 17 presents a flow diagram illustrating a method 1700 for operating in a selective monitoring mode and an expansive monitoring mode, which may be performed by an electronic device (such as one of monitoring electronic devices 110 or viewing electronic devices 112 in FIG. 1, or another electronic device that may be included in FIG. 1). During selective monitoring mode 1710, the electronic device may acquire acoustic information (operation 1712) using an acoustic sensor that is in or associated with the electronic device (such as an acoustic sensor that is included in an environment of the electronic device, and that communicates with the electronic device using wireless and/or wired communication). Then, the electronic device may analyze the acoustic information (operation 1714) to identify or classify an event in the environment in a first group of events (such as a baby crying, glass breaking, a fire alarm or a carbon-monoxide-detector alarm, a loud noise, a noise other than an individual talking, a sign of life that indicates an individual is alive and is ok, etc.). Based on the identified event, the electronic device may perform a remedial action (operation 1716), such as provide a notification or an alert, sound an alarm, dial 911, etc.

When a change condition is detected (operation 1718), the electronic device may transition to expansive monitoring mode 1720. For example, the electronic device may automatically transition to expansive monitoring mode 1720 (without requiring that a user take action) when the electronic device determines, based on acoustic or other information, that a user has left the environment (such as when the user has left their home or apartment based on an absence of certain sounds, a sound of a door or a garage closing, a sound of a key in a lock, etc.). Alternatively or additionally, a user of the electronic device may indicate the change condition, such as by activating a virtual icon on a touch-sensitive display, a physical button, etc. In some embodiments, the user of the electronic device may indicate the change condition by saying a wake word and/or a predefined keyword.

Note that the electronic device may operate in selective monitoring mode 1710 when the acoustic information indicates that an individual or a user in the environment is awake, and may transition to the expansive monitoring mode 1720 when the individual is asleep. Moreover, the electronic device may transition to the expansive monitoring mode 1720 (and, as discussed below, may send acoustic information for remote processing/analysis) when an event that cannot be identified or classified occurs. Thus, the electronic device may transition to or from the expansive monitoring mode 1720 as needed, so that the privacy of the individual can be protected or maintained.

During the expansive monitoring mode 1720, the electronic device may acquire acoustic information (operation 1722) using the acoustic sensor that is in or associated with the electronic device. Then, using an interface circuit, the electronic device may provide the acoustic information (operation 1724) to a remote computer, so that the remote computer can identify or classify an event in the environment in a second group of events (which may include more events than the first group of events). Next, the electronic device may receive information (operation 1726) from the remote computer. This information may include an identified event or a notification based on the identified event. In response, the electronic device may perform a remedial action (operation 1728), such as provide a notification or an alert, sound an alarm, dial 911, turn on fire sprinklers, open a drain, cut electric power, gas or another utility, activate a safety device, etc.

Note that during selective monitoring mode 1710 and expansive monitoring mode 1720, the user may not need to provide a wake word or a predefined keyword to the electronic device, e.g., the electronic device may operate automatically based on non-verbal acoustic information (such as sounds in the environment, which may be other than spoken words, and thus, may be within or outside of an audible range of frequencies). Moreover, in the monitoring technique described in FIGS. 15 and 17, the notifications may be provided from machine-to-machine and/or from machine-to-individual.

In some embodiments, the electronic device optionally performs one or more additional operations (operation 1730). For example, when a sound or acoustic information in the selective monitoring mode that cannot be identified is detected, the electronic device may request feedback from a user. Thus, the user may be asked to classify the sound as one of the first group of events, to define or specify a new event to add to the first group of events, or may instruct the electronic device to ignore or dismiss the sound.

In some embodiments, the electronic device may be integrated with or may work with an intelligent personal assistant in the environment. Note that an 'intelligent personal assistant' may be an electronic device that uses natural language processing (so that it can be voice controlled) and local and/or or remote machine-intelligence capabilities (such as a neural network, a search engine, etc.) to implement a wide variety of functions (such as playing music, performing searches, accessing online resources, home automation, etc.). Then, in the expansive monitoring mode 1720, the electronic device may send (electronically, wirelessly and/or acoustically) the acoustic information for local and/or remote processing via the intelligent personal assistant.

In some embodiments of methods 200 (FIG. 2), 700 (FIG. 7), 900 (FIG. 9), 1200 (FIG. 12), 1500 (FIG. 15) and/or 1700 (FIG. 17) there may be additional or fewer operations. Moreover, the order of the operations may be changed, and/or two or more operations may be combined into a single operation.

Figure 18:
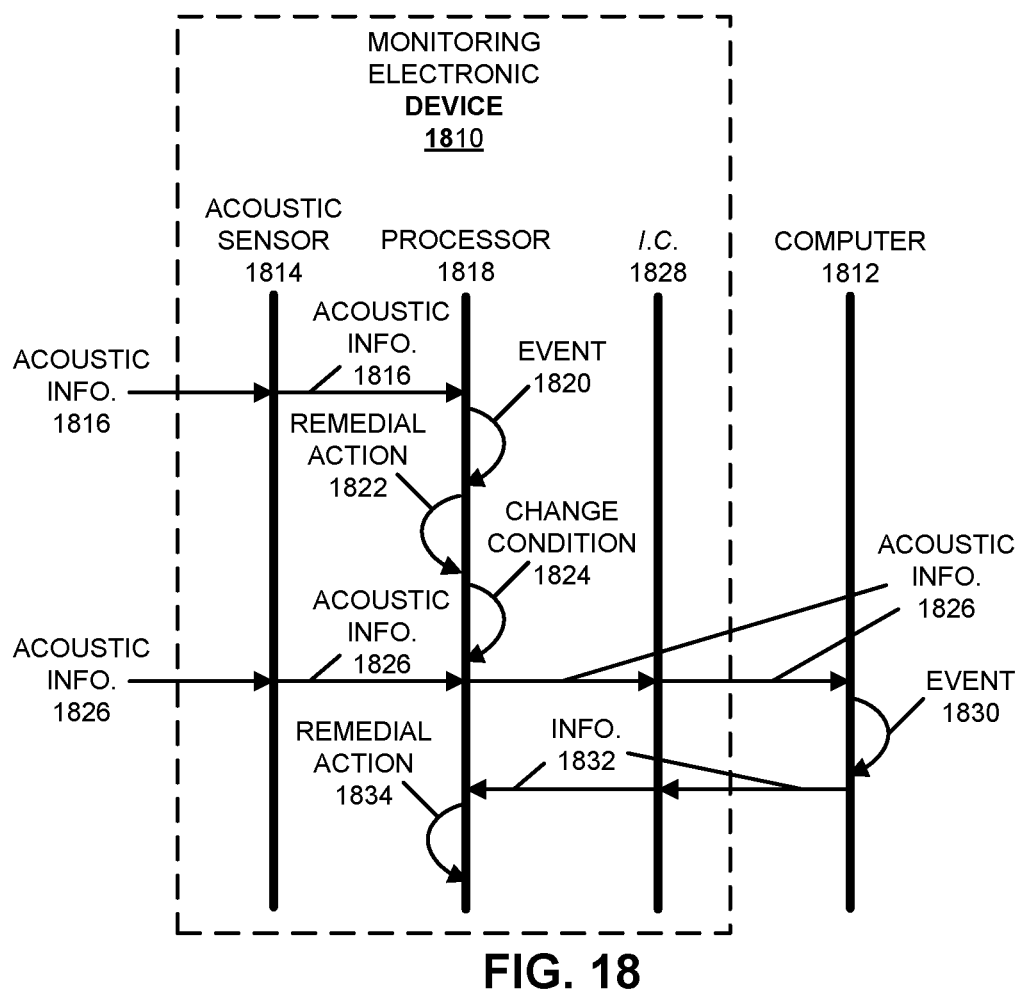
FIG. 18 is a drawing illustrating communication among at least some of the electronic devices of FIG. 1 in accordance with an embodiment of the present disclosure.

FIG. 18 presents a drawing illustrating communication among monitoring electronic device 1810 and computer 1812. During the selective monitoring mode 1710, an acoustic sensor 1814 in monitoring electronic device 1810 may acquire acoustic information 1816. Then, processor 1818 in monitoring electronic device 1810 may analyze acoustic information 1816 to identify or classify an event 1820 in the environment in a first group of events. Based on the identified event 1820, processor 1818 may perform a remedial action 1822.

When processor 1818 determines a change condition 1824 has occurred, processor 1818 may transition to the expansive monitoring mode 1720. During the expansive monitoring mode 1720, acoustic sensor 1814 may acquire acoustic information 1826. Then, processor 1818 may provide acoustic information 1826 to interface circuit 1828 in monitoring electronic device 1810, which may provide acoustic information 1826 to computer 1812.

After receiving acoustic information 1826, computer 1812 may identify or classify an event 1830 in the environment in a second group of events (which may include more events than the first group of events).

Next, computer 1812 may provide information 1832 to monitoring electronic device 1810. This information may include or may indicate an identified event or a notification based on the identified event. After receiving information 1832, interface circuit 1828 may provide information 1832 to processor 1818. In response, processor 1818 may perform a remedial action 1834.

Note that in FIGS. 3, 8, 10, 13, 16 and 18 any of the illustrated instances of communication between components and/or electronic devices may be bilateral or unilateral.

We now describe embodiments of an electronic device. FIG. 19 presents a block diagram illustrating an electronic device 1900, such as one of monitoring electronic devices 110, one of viewing electronic devices 112, optional access point 114, optional storage electronic device 116 or controller electronic device 118 in FIG. 1. (In the discussion that follows, the functionality of one of monitoring electronic devices 110 or one of viewing electronic devices 112 is used as an illustration. Other electronic devices, such as controller electronic device 118, may have a subset of this functionality.) This electronic device includes processing subsystem 1910 (and, more generally, an integrated circuit or a control mechanism), memory subsystem 1912, networking subsystem 1914, power subsystem 1916, optional sensor subsystem 1920 (i.e., a data-collection subsystem and, more generally, a sensor mechanism) and optional sensory-output subsystem 1934. Processing subsystem 1910 includes one or more devices configured to perform computational operations (such as executing techniques to process captured images, measured acoustic information and, more generally, sensor data). For example, processing subsystem 1910 can include one or more microprocessors, application-specific integrated circuits (ASICs), microcontrollers, programmable-logic devices, and/or one or more digital signal processors (DSPs).

Memory subsystem 1912 includes one or more devices for storing data and/or instructions for processing subsystem

1910, networking subsystem 1914 and/or optional sensor subsystem 1920. For example, memory subsystem 1912 can include dynamic random access memory (DRAM), static random access memory (SRAM), and/or other types of memory. In some embodiments, instructions for processing subsystem 1910 in memory subsystem 1912 include: one or more program modules or sets of instructions (such as one or more program modules 1928), which may be executed in an operating environment (such as operating system 1930) by processing subsystem 1910. While the one or more program modules 1928 executed by processing subsystem 1910 may be resident on electronic device 1900 (such as stand-alone applications or portions of one or more other applications that are resident on and which execute on electronic device 1900), in some embodiments a given one of the one or more program modules 1928 may be embedded in a web page that is provided by a remote server or computer via a network, and which is rendered by a web browser on electronic device 1900. For example, at least a portion of the given program module may be an application tool that is embedded in the web page, and which executes in a virtual environment of the web browser. Thus, the application tool may be provided to electronic device 1900 via a client-server architecture. Note that the one or more computer programs may constitute a computer-program mechanism. Moreover, instructions in the various modules in memory subsystem 1912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1910.

In addition, memory subsystem 1912 can include mechanisms for controlling access to the memory. In some embodiments, memory subsystem 1912 includes a memory hierarchy that comprises one or more caches coupled to a memory in electronic device 1900. In some of these embodiments, one or more of the caches is located in processing subsystem 1910.

In some embodiments, memory subsystem 1912 is coupled to one or more high-capacity mass-storage devices (not shown). For example, memory subsystem 1912 can be coupled to a magnetic or optical drive, a solid-state drive, or another type of mass-storage device. In these embodiments, memory subsystem 1912 can be used by electronic device 1900 as fast-access storage for often-used data, while the mass-storage device is used to store less frequently used data.

Networking subsystem 1914 includes one or more devices configured to couple to and communicate on a wired and/or wireless network (i.e., to perform network operations and, more generally, communication), including: interface circuit 1924 and one or more associated antennas 1926. (While FIG. 19 includes one or more antennas 1926, in some embodiments electronic device 1900 includes one or more nodes on interface circuit 1924, e.g., pads, which can be coupled to one or more antennas 1926. Thus, electronic device 1900 may or may not include one or more antennas 1926.) For example, networking subsystem 1914 can include: a ZigBee® networking subsystem, a Bluetooth networking system (such as Bluetooth Low Energy), a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, an infra-red communication system, a power-line communication system and/or another communication system (such as a near-field-communication system or an ad-hoc-network networking system). Note that the combination of interface circuit 1924 and at least one of one or more antennas 1926 may constitute a radio.

Moreover, networking subsystem 1914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. In some embodiments, a 'network' between the electronic devices does not yet exist. Therefore, electronic device 1900 may use the mechanisms in networking subsystem 1914 for performing simple wireless communication between the electronic devices, e.g., transmitting advertising or beacon frames and/or scanning for advertising frames transmitted by other electronic devices.

Furthermore, electronic device 1900 may include power subsystem 1916 with one or more power sources 1918. Each of these power sources may include: a battery (such as a rechargeable or a non-rechargeable battery), a DC power supply, a transformer, and/or a switched-mode power supply. Moreover, the one or more power sources 1918 may operate in a voltage-limited mode or a current-limited mode. Furthermore, these power sources may be mechanically and electrically coupled by a male or female adaptor to: a wall or electrical-outlet socket or plug (such as a two or three-pronged electrical-outlet plug, which may be collapsible or retractable), a light socket (or light-bulb socket), electrical wiring (such as a multi-wire electrical terminal), a generator, a USB port or connector, a DC-power plug or socket, a cellular-telephone charger cable, a photodiode, a photovoltaic cell, etc. This mechanical and electrical coupling may be rigid or may be remateable. Note that the one or more power sources 1918 may be mechanically and electrically coupled to an external power source or another electronic device.

Additionally, optional sensor subsystem 1920 may include one or more sensor devices 1922 (or a sensor array), which may include one or more processors and memory. For example, the one or more sensor devices 1922 may include: a thermal sensor (such as a thermometer), a humidity sensor, a barometer, a camera or video recorder (such as a CCD or CMOS imaging sensor), a flash or an optical or infra-red light source, one or more microphones or acoustic transducers (which may be able to record sound, including acoustic information in a band of frequencies, in mono or stereo, and/or directional information, e.g., using an acoustic array), a load-monitoring sensor or an electrical-characteristic detector (and, more generally, a sensor that monitors one or more electrical characteristics), an infrared sensor (which may be active or passive), a microscope, a particle detector (such as a detector of dander, pollen, dust, exhaust, etc.), an air-quality sensor, a particle sensor, an optical particle sensor, an ionization particle sensor, a smoke detector (such as an optical smoke detector or an ionizing smoke detector), a fire-detection sensor, a radon detector, a carbon-monoxide detector, a chemical sensor or detector, a volatile-organic-compound sensor, a combustible gas sensor, a chemical-analysis device, a mass spectrometer, a microanalysis device, a nano-plasmonic sensor, a genetic sensor (such as a micro-array), an accelerometer, a position or a location sensor (such as a location sensor based on GPS), a gyroscope, a motion sensor (such as a light-beam sensor), a contact sensor, a strain sensor (such as a strain gauge), a proximity sensor, a microwave/radar sensor (which may be active or passive), an ultrasound sensor, a vibration sensor, a fluid flow sensor, a photo-detector, a Geiger counter, a radio-frequency radiation detector, and/or another device that measures a physical effect or that characterizes an environmental factor or physical phenomenon (either directly or indirectly). Note that the one or more sensor devices 1922 may include redundancy (such as multiple instances of a type of sensor device) to address sensor failure or erroneous readings, to provide improved accuracy and/or to provide improved precision.

Moreover, optional sensory-output subsystem 1934 may include one or more output devices 1936, such as a display and/or one or more speakers (or acoustic transducers). One or more output devices 1936 may be used to display images and/or to output sound.

During operation of electronic device 1900, processing subsystem 1910 may execute one or more program modules 1928, such as an environmental-monitoring application to perform the environmental monitoring technique and/or the association technique. For example, the one or more program modules 1928 may use one or more sensor devices 1922 to monitor one or more environmental conditions in an environment that includes electronic device 1900. The resulting sensor data (or content) may be shared with one or more other electronic devices (such as another electronic device executing instances of the one or more program modules 1928) via networking subsystem 1914.

Within electronic device 1900, processing subsystem 1910, memory subsystem 1912, networking subsystem 1914, power subsystem 1916, optional sensor subsystem 1920 and/or optional sensory-output subsystem 1934 may be coupled using one or more interconnects, such as bus 1932. These interconnects may include an electrical, optical, and/or electro-optical connection that the subsystems can use to communicate commands and data among one another. Although only one bus 1932 is shown for clarity, different embodiments can include a different number or configuration of electrical, optical, and/or electro-optical connections among the subsystems.

Electronic device 1900 can be (or can be included in) a wide variety of electronic devices, such as an electronic device with at least one network interface. For example, electronic device 1900 can be (or can be included in): a sensor (such as a smart sensor), a tablet computer, a smartphone or a cellular telephone, an appliance, a regulator device, a consumer-electronic device (such as a baby monitor), a portable computing device, an access point, a router, a switch, communication equipment, test equipment, a digital signal processor, a controller, a personal digital assistant, a laser printer (or other office equipment such as a photocopier), a personal organizer, a toy, a set-top box, a computing device (such as a laptop computer, a desktop computer, a server, and/or a subnotebook/netbook), a light (such as a nightlight), a space heater, an alarm, a smoke detector, a carbon-monoxide detector, an environmental monitoring device (which monitors an environmental condition in the environment that includes electronic device 1900), and/or another electronic device.

Although specific components are used to describe electronic device 1900, in alternative embodiments, different components and/or subsystems may be present in electronic device 1900. For example, electronic device 1900 may include one or more additional processing subsystems, memory subsystems, networking subsystems, power subsystems, sensor subsystems and/or sensory-output subsystems. Moreover, one or more of the subsystems may not be present in electronic device 1900. For example, two or more components or subsystems in electronic device 1900 may be implemented on a single integrated circuit, such as processing subsystem 1910 and networking subsystem 1914, which may be implemented using a system-on-chip integrated circuit. Furthermore, in some embodiments, electronic device 1900 may include one or more additional subsystems that are not shown in FIG. 19 such as a user-interface subsystem, a display subsystem, and/or a feedback subsystem (which may include speakers and/or an optical source).

Figure 19:
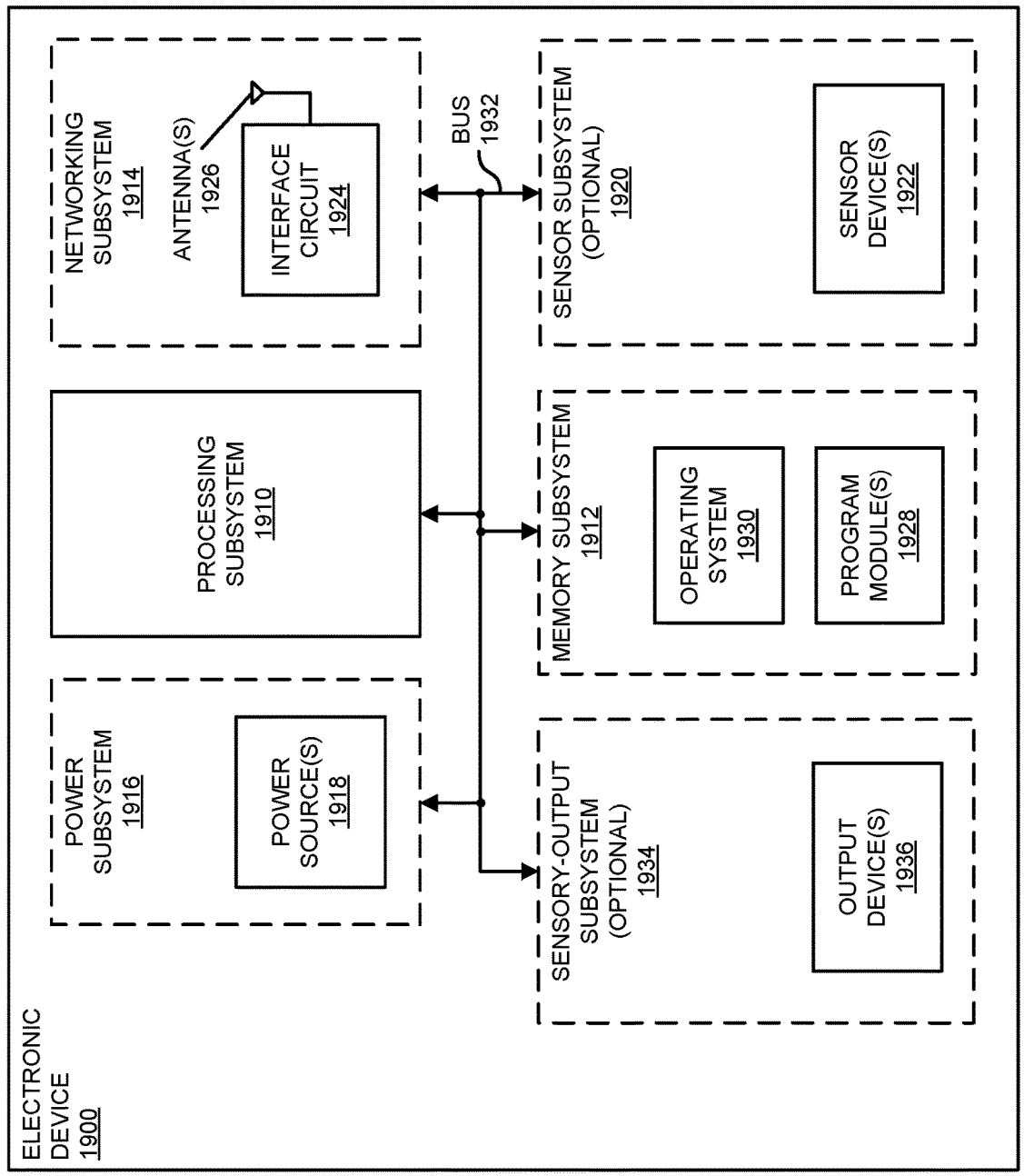
FIG. 19 is a block diagram illustrating an electronic device in FIG. 1 in accordance with an embodiment of the present disclosure.

Although separate subsystems are shown in FIG. 19, in some embodiments, some or all of a given subsystem or component can be integrated into one or more of the other subsystems or component(s) in electronic device 1900. For example, in some embodiments program module 1928 is included in operating system 1930. In some embodiments, a component in a given subsystem is included in a different subsystem.

Moreover, the circuits and components in electronic device 1900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1914, such as one or more radios. Moreover, the integrated circuit may include hardware and/or software mechanisms that are used for transmitting wireless signals from electronic device 1900 and receiving signals at electronic device 1900 from other electronic devices. Aside from the mechanisms herein described, radios are generally known in the art and hence are not described in detail. In general, networking subsystem 1914 and/or the integrated circuit can include any number of radios. Note that the radios in multiple-radio embodiments function in a similar way to the radios described in single-radio embodiments.

In some embodiments, networking subsystem 1914 and/or the integrated circuit include a configuration mechanism (such as one or more hardware and/or software mechanisms) that configures the radios to transmit and/or receive on a given channel (e.g., at a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, etc.)

The described embodiments of the environmental monitoring technique and the association technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the environmental monitoring technique and the association technique may be implemented using program module 1928, operating system 1930 (such as drivers for interface circuit 1924) and/or in firmware in interface circuit 1924. Alternatively or additionally, at least some of the operations in the environmental monitoring technique and the association technique may be implemented in a physical layer, such as hardware in interface circuit 1924.

Note that the functions of electronic device 1900 may be distributed over a large number of servers or computers, with various groups of the servers or computers performing particular subsets of the functions. These servers or computers may be at one or more locations. Thus, in some embodiments electronic device 1900 includes a computer system.

In the preceding description, we refer to 'some embodiments.' Note that 'some embodiments' describes a subset of all of the possible embodiments, but does not always specify the same subset of embodiments.

While examples of numerical values are provided in the preceding discussion, in other embodiments different numerical values are used. Consequently, the numerical values provided are not intended to be limiting.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an interface circuit configured to wirelessly communicate;
    a computational device electrically coupled to the interface circuit, wherein the computational device comprises: a processor, or another type of computational device; and
    memory, electrically coupled to the computational device, storing program instructions, wherein, when executed by the computational device, the program instructions cause the electronic device to perform operations comprising
        receiving, using the interface circuit, first association information for a first set of additional monitoring electronic devices, wherein the association information is based at least in part on a presence of a monitoring electronic device at a fixed location for a first time duration, and wherein the first set of additional monitoring electronic devices are within a first distance of the fixed location;
        establishing one or more associations with the first set of additional monitoring electronic devices based at least in part on the first association information;
        receiving, using the interface circuit, second association information for a second set of additional monitoring electronic devices, wherein the association information is based at least in part on the presence of the monitoring electronic device at the fixed location for a second time duration, wherein the second set of additional monitoring electronic devices are within a second distance of the fixed location, and wherein the second time duration is greater than the first time duration, and the second distance is greater than the first distance; and
        establishing one or more associations with the second set of additional monitoring electronic devices based at least in part on the second association information.

2. The electronic device of claim 1, wherein the operations comprise:
    obtaining a pattern of activity of a second electronic device in a region that includes the electronic device, wherein the pattern of activity is based at least in part on information associated with one or more of: the monitoring electronic device, a first additional monitoring electronic device in the first set of additional monitoring electronic devices, or a second additional monitoring electronic device in the second set of additional monitoring electronic devices; and
    determining an association between the second electronic device and an event in the region based at least in part on the pattern of activity.

3. The electronic device of claim 2, wherein the event comprises a location, a timestamp, and one of: reported criminal activity, a type of service, or another type of activity in a neighborhood.

4. The electronic device of claim 2, wherein the operations comprise receiving an identifier of the second electronic device, and the determined association is based at least in part on the identifier.

5. The electronic device of claim 4, wherein the identifier comprises one or more of:
a Media Access Control (MAC) address of the second electronic device; is associated with an application that is installed on the second electronic device; or is another type of identifier.

6. The electronic device of claim 2, wherein the pattern of activity comprises timestamps and location information of the second electronic device in the region.

7. The electronic device of claim 6, wherein the location information comprises locations of the second electronic devices or proximity of the second electronic device to one or more of: the monitoring electronic device, the first additional monitoring electronic device, or the second additional monitoring electronic device.

8. The electronic device of claim 2, wherein the operations comprise providing a recommendation that the second electronic device be allowed to pair, connect or associate with a wireless network in the region based at least in part on a repeated presence of the second electronic device in the region.

9. A non-transitory computer-readable storage medium for use in conjunction with an electronic device, the computer-readable storage medium storing program instructions, wherein, when executed by the electronic device, the program instructions cause the electronic device to perform operations, comprising:
    receiving first association information for a first set of additional monitoring electronic devices, wherein the association information is based at least in part on a presence of a monitoring electronic device at a fixed location for a first time duration, and wherein the first set of additional monitoring electronic devices are within a first distance of the fixed location;
    establishing one or more associations with the first set of additional monitoring electronic devices based at least in part on the first association information;

receiving second association information for a second set of additional monitoring electronic devices, wherein the association information is based at least in part on a presence of the monitoring electronic device at the fixed location for a second time duration, wherein the second set of additional monitoring electronic devices are within a second distance of the fixed location, and wherein the second time duration is greater than the first time duration, and the second distance is greater than the first distance; and establishing one or more associations with the second set of additional monitoring electronic devices based at least in part on the second association information.

10. The non-transitory computer-readable storage medium of claim 9, wherein the operations comprise:

obtaining a pattern of activity of a second electronic device in a region that includes the electronic device, wherein the pattern of activity is based at least in part on information associated with one or more of: the monitoring electronic device, a first additional monitoring electronic device in the first set of additional monitoring electronic devices, or a second additional monitoring electronic device in the second set of additional monitoring electronic devices; and determining an association between the second electronic device and an event in the region based at least in part on the pattern of activity.

11. The non-transitory computer-readable storage medium of claim 10, wherein the event comprises a location, a timestamp, and one of: reported criminal activity, a type of service, or another type of activity in a neighborhood.

12. The non-transitory computer-readable storage medium of claim 10, wherein the operations receiving an identifier of the second electronic device, and the determined association is based at least in part on the identifier.

13. The non-transitory computer-readable storage medium of claim 12, wherein the identifier comprises one or more of: a Media Access Control (MAC) address of the second electronic device; is associated with an application that is installed on the second electronic device; or is another type of identifier.

14. The non-transitory computer-readable storage medium of claim 10, wherein the pattern of activity comprises timestamps and location information of the second electronic device in the region.

15. The non-transitory computer-readable storage medium of claim 14, wherein the location information comprises locations of the second electronic device or proximity of the second electronic device to one or more of: the monitoring electronic device, the first additional monitoring electronic device, or the second additional monitoring electronic device.

16. The non-transitory computer-readable storage medium of claim 10, wherein the operations comprise providing a recommendation that the second electronic device be allowed to pair, connect or associate with a wireless network in the region based at least in part on a repeated presence of the second electronic device in the region.

17. A method for establishing one or more second associations, comprising:

by an electronic device:

receiving first association information for a first set of additional monitoring electronic devices, wherein the association information is based at least in part on a presence of a monitoring electronic device at a fixed location for a first time duration, and wherein the first set of additional monitoring electronic devices are within a first distance of the fixed location;

establishing one or more associations with the first set of additional monitoring electronic devices based at least in part on the first association information;

receiving second association information for a second set of additional monitoring electronic devices, wherein the association information is based at least in part on a presence of the monitoring electronic device at the fixed location for a second time duration, wherein the second set of additional monitoring electronic devices are within a second distance of the fixed location, and wherein the second time duration is greater than the first time duration, and the second distance is greater than the first distance; and establishing the one or more second associations with the second set of additional monitoring electronic devices based at least in part on the second association information.

18. The method of claim 17, wherein the method comprises:

obtaining a pattern of activity of a second electronic device in a region that includes the electronic device, wherein the pattern of activity is based at least in part on information associated with one or more of: the monitoring electronic device, a first additional monitoring electronic device in the first set of additional monitoring electronic devices, or a second additional monitoring electronic device in the second set of additional monitoring electronic devices; and determining an association between the second electronic device and an event in the region based at least in part on the pattern of activity.

19. The method of claim 18, wherein the event comprises a location, a timestamp, and one of: reported criminal activity, a type of service, or another type of activity in a neighborhood.

20. The method of claim 17, wherein the pattern of activity comprises timestamps and location information of the second electronic device in the region.

* * * * *